(12) United States Patent
Suzuki et al.

(10) Patent No.: US 6,359,717 B2
(45) Date of Patent: Mar. 19, 2002

(54) OPTICAL SCANNING APPARATUS AND SCANNING IMAGE FORMING LENS

(75) Inventors: Seizo Suzuki; Magane Aoki, both of Kanagawa-ken; Kobji Sakai, Tokyo, all of (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 09/874,793

(22) Filed: Jun. 6, 2001

Related U.S. Application Data

(62) Division of application No. 09/369,612, filed on Aug. 6, 1999.

(30) Foreign Application Priority Data

Aug. 31, 1998 (JP) ............................................. 10-245791
Sep. 30, 1998 (JP) ........................................... 10-277869

(51) Int. Cl.⁷ ............................................. G02B 26/08
(52) U.S. Cl. ..................... 359/205; 359/206; 359/207; 359/204; 359/216; 359/217; 359/900; 347/259
(58) Field of Search ................................ 359/204–207, 359/216–219, 662, 708, 716–718, 900; 347/225, 233, 244, 243, 254, 256–261

(56) References Cited

U.S. PATENT DOCUMENTS

| | | | |
|---|---|---|---|
| 5,005,298 A | 4/1991 | Nagasawa et al. | 33/573 |
| 5,355,244 A | 10/1994 | Suzuki et al. | 359/212 |

(List continued on next page.)

FOREIGN PATENT DOCUMENTS

| | | |
|---|---|---|
| JP | 7-69521 | 1/1990 |
| JP | 7-113950 | 5/1995 |
| JP | 8122635 | 5/1996 |
| JP | 8-297256 | 11/1996 |
| JP | 10-148755 | 6/1998 |

OTHER PUBLICATIONS

U.S. Patent Appln. No. 09/369,612 (filed Aug. 6, 1999)—parent application.
U.S. Patent Appln. No. 09/344,633 (filed Jun. 25, 1999)—Incorporated by reference.

*Primary Examiner*—James Phan
(74) *Attorney, Agent, or Firm*—Greenberg Traurig LLP

(57) ABSTRACT

An optical scanning apparatus includes a light source for outputting light, a first lens system arranged to receive the light output from the light source and to transmit a light flux therefrom, an optical deflector arranged to receive the light flux from the first lens system and having a deflecting reflective plane to deflect the light flux from a surface therefrom and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist. The second lens system has a scanning and image forming element including at least one surface including a plurality of portions each having a non-arc shape in a sub-scanning direction such that at least two of the non-arc shapes are different from each other and such that an effective writing width W and a width Fs of the sub-scanned image-surface curvature located within the effective writing width satisfies the condition Fs/W<0.005. Alternatively, the second lens system includes a scanning and image forming element including at least one surface including a plurality of portions each having a non-arc shape in a sub-scanning direction such that at least one lens surface is a sub non-circular arc surface and a shape in a sub-scanning cross section of the sub non-arc circular shape is a non-arc shape and the non-arc shape changes in accordance with a position of the sub-scanning cross section in the main scanning direction.

17 Claims, 12 Drawing Sheets

U.S. PATENT DOCUMENTS

| | | |
|---|---|---|
| 5,418,639 A | 5/1995 | Yamazaki ............... 359/216 |
| 5,459,601 A | 10/1995 | Suzuki et al. ............ 359/205 |
| 5,546,216 A | 8/1996 | Suzuki ..................... 359/216 |
| 5,717,511 A | 2/1998 | Suzuki ..................... 359/204 |
| 5,737,112 A * | 4/1998 | Lizuka ..................... 359/205 |
| 5,805,199 A | 9/1998 | Aoki ........................ 347/256 |
| 6,130,768 A | 10/2000 | Ono ......................... 359/207 |

* cited by examiner

EXAMPLE 1

EXAMPLE 1

EXAMPLE 1

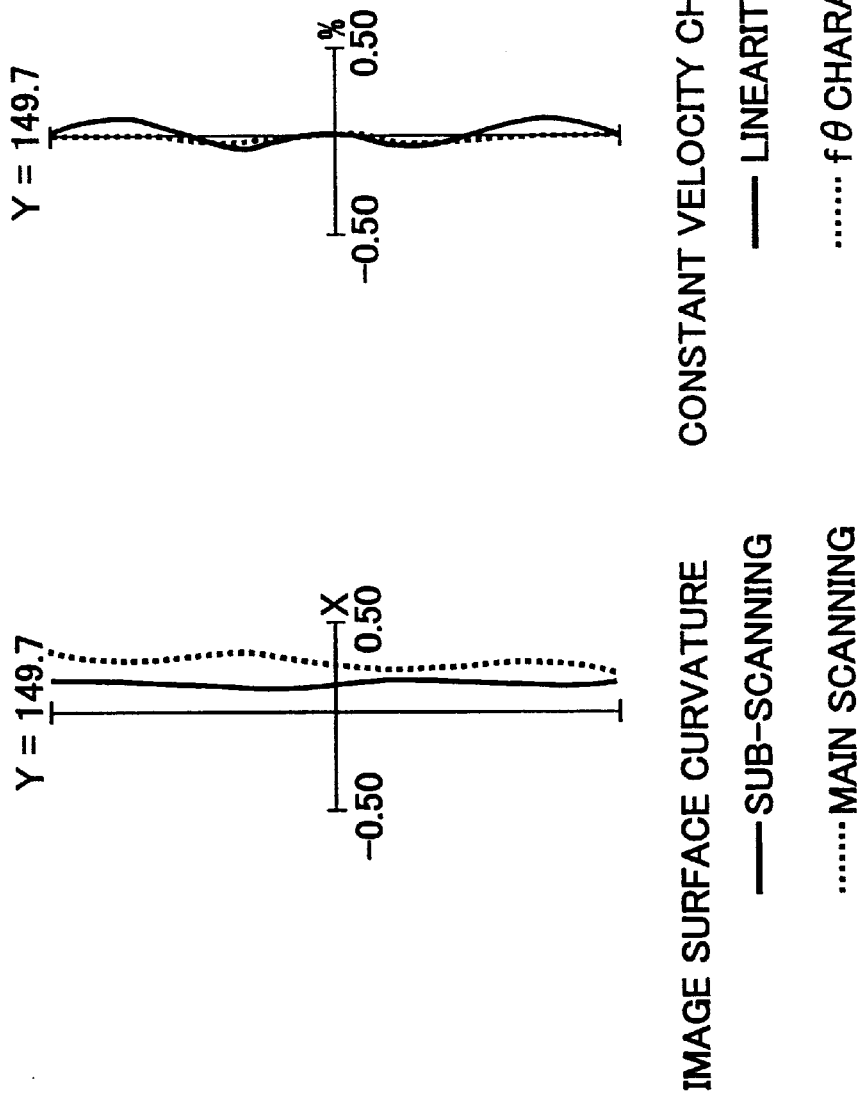

EXAMPLE 2 a: MAIN SCANNING

EXAMPLE 2 b: SUB-SCANNING

RECTANGULAR APERTURE
DIAMETER (MAIN:7.4mm, SUB:3.7mm)
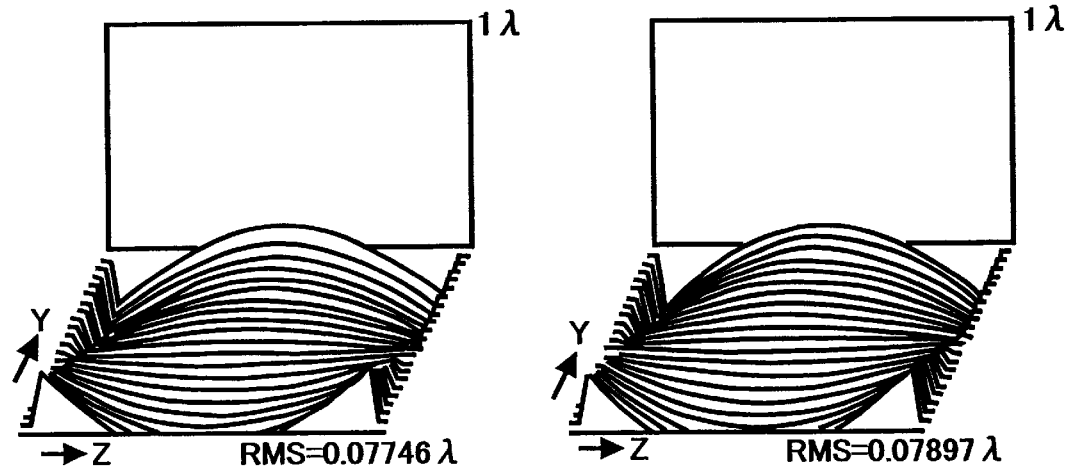
FIG. 8A  IMAGE HEIGHT: +150
FIG. 8B  IMAGE HEIGHT: +100
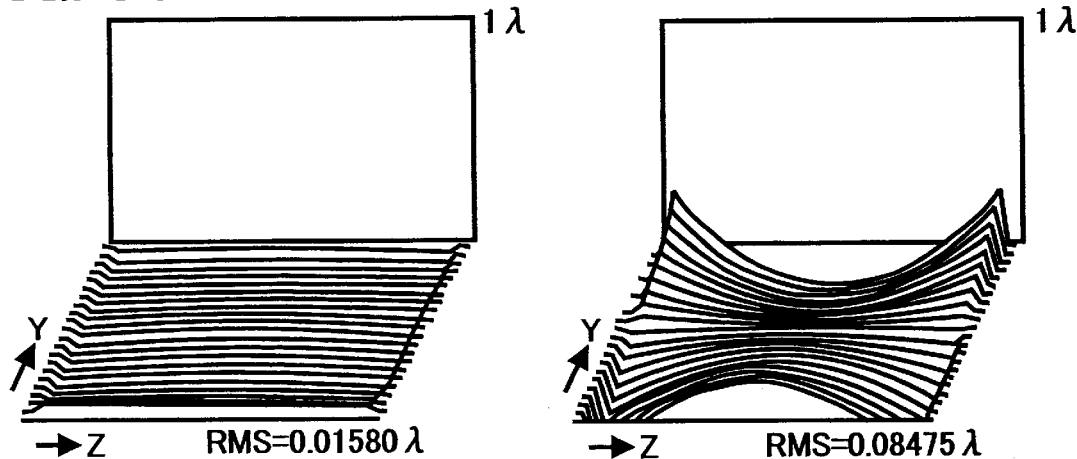
FIG. 8C  IMAGE HEIGHT: 0
FIG. 8D  IMAGE HEIGHT: -100
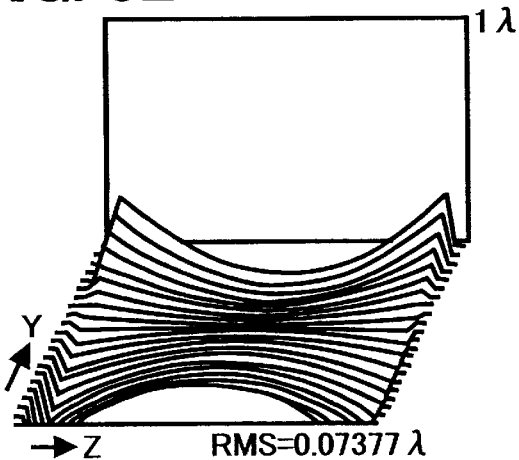
FIG. 8E  IMAGE HEIGHT: -150

FOUR-CORNERS 40% CUT APERTURE DIAMETER
(MAIN:7.4mm, SUB:3.7mm)
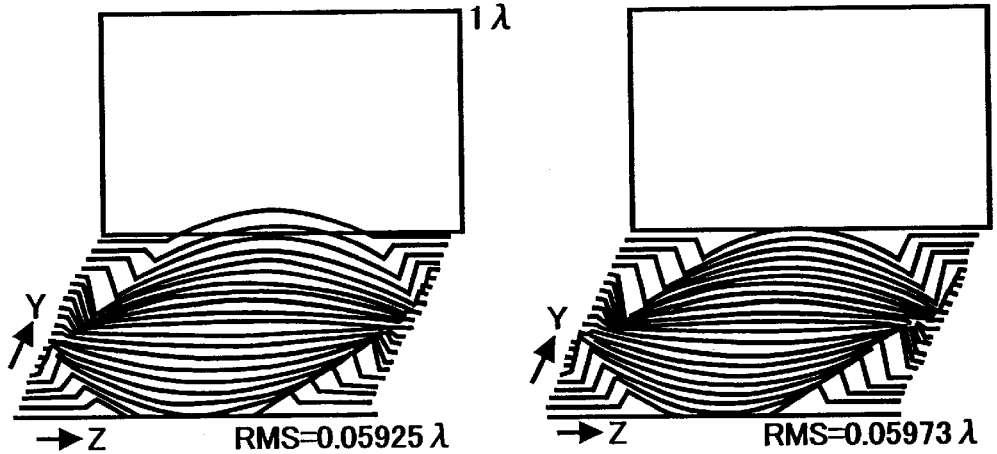
FIG. 9A IMAGE HEIGHT: +150
FIG. 9B IMAGE HEIGHT: +100
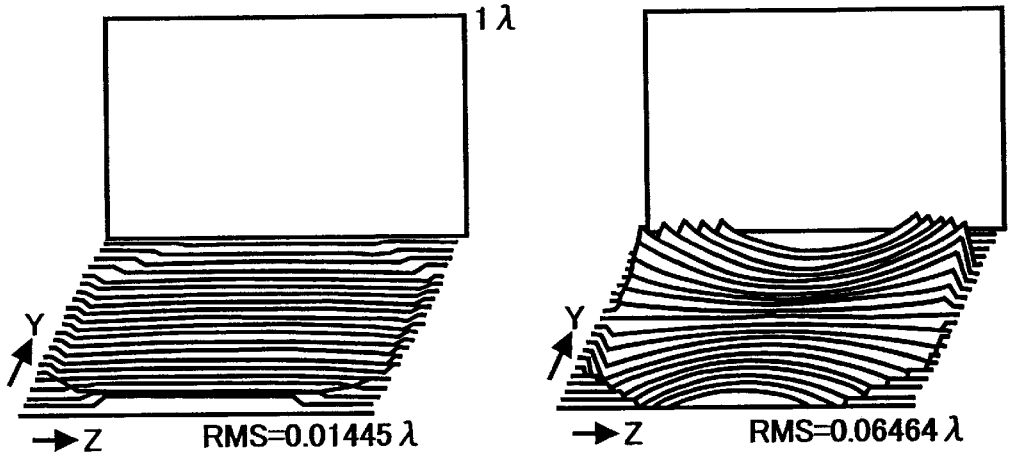
FIG. 9C IMAGE HEIGHT: 0
FIG. 9D IMAGE HEIGHT: -100
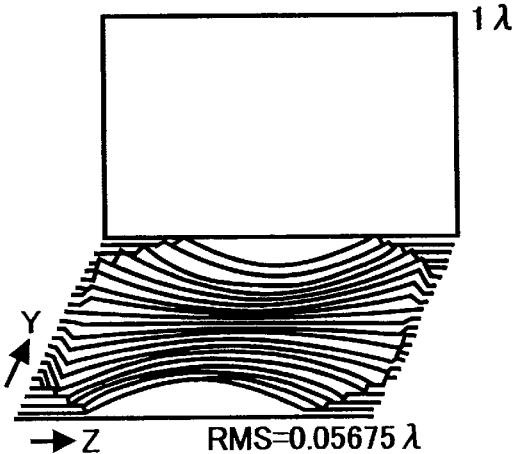
FIG. 9E IMAGE HEIGHT: -150

EXAMPLE 2

EXAMPLE 3

EXAMPLE 2 a: MAIN SCANNING

EXAMPLE 2 b: SUB-SCANNING

OPTICAL SCANNING APPARATUS AND SCANNING IMAGE FORMING LENS

The present application is a division of co-pending U.S. application Ser. No. 09/369,612, filed Aug. 6, 1999, pending, the teaching of which is incorporated herein in its entirety by reference. In addition, The present application is related to and hereby incorporates by reference the subject matter of commonly assigned U.S. patent application Ser. No. 09/344,633 filed on Jun. 25, 1999, entitled "OPTICAL SCANNING APPARATUS" by Seizo SUZUKI et al.

BACKGROUND OF THE INVENTION

1. Field of the Invention

The present invention relates to optical scanning apparatuses and scanning image forming lenses.

2. Discussion of the Background

The required writing density of an optical scanning device used in a recording unit of a facsimile or digital copying machine, a laser printer or other similar image forming apparatuses, has been recently greatly increased. Also, there has been a great demand recently for ensuring that the light beam spots converged on a scanned surface are greatly reduced in size and have a uniform size.

In order to obtain an excellent recorded image having a constant image resolution by use of an image forming apparatus having an optical scanning apparatus, it is important that a beam spot diameter does not vary in relation to a scanning position, i.e., that the beam spots are uniform in diameter along a scanning line. To realize such stability of beam spot diameter, an image-surface curvature in an optical system needs to be satisfactorily corrected, and various attempts to realize the satisfactory correction of the image-surface curvature have been made.

To perform a satisfactory image writing at a remarkably high writing density such as 600 dpi or 1200 dpi, a beam spot having a small beam spot diameter is necessary. To realize the small beam spot diameter satisfactorily and with good stability, a conventional geometric optical correction of image-surface curvature, optical magnification or the like is insufficient, and it is important to make sure that a wave-optical wave aberration is constant irrespective of the image height of the beam spot. More specifically, as the beam spot diameter decreases, a larger luminous-flux diameter becomes necessary, so that paraxial correction by geometrical optics is insufficient.

In the prior art, a polygon mirror functioning as a light deflecting device is sometimes tilted to achieve a desired surface tilt for effectively deflecting a luminous flux to be impinged on a surface to be scanned. However, this surface tilt of the polygon mirror causes problems with a field of curvature and beam waist of the beam spot impinged on the surface to be scanned. Prior art devices have not recognized the combined problems with field of curvature and beam waist and therefore, have not provided solutions for correcting these problems. As most, the prior art only focused on correcting the beam waist problem only at the center image height and did not recognize the necessity or the way to correct the beam waist problem for all image heights.

Also, when multiple beams are used for a light source, the image surface curvature causes uneven scanning pitches in the sub-scanning direction. That is, the scanning line intervals are not constant over an entire range of image heights, and instead, the scanning line intervals vary according to image height.

SUMMARY OF THE INVENTION

In order to overcome the problems described above, preferred embodiments of the present invention provide an optical scanning apparatus and a scanning image forming lens which correct wave aberration satisfactorily, achieve a reliably uniform and greatly reduced beam spot diameter, while achieving a desired very high writing density.

In addition, preferred embodiments of the present invention provide an optical scanning apparatus and a scanning image forming lens which correct and minimize a beam waist at all image heights along the surface to be scanned and also correct field of curvature such that a beam spot diameter is minimized and made uniform for all beam spots impinged on the surface to be scanned.

According to one preferred embodiment of the present invention, an optical scanning apparatus includes a light source for outputting light, a first lens system arranged to receive the light output from the light source and to transmit a light flux therefrom, an optical deflector arranged to receive the light flux from the first lens system and having a deflecting reflective plane to deflect the light flux from a surface therefrom and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist. The second lens system has a scanning and image forming element including at least one surface including a plurality of portions each having a non-arc shape in a sub-scanning direction such that at least two of the non-arc shapes are different from each other and such that an effective writing width W and a width Fs of the sub-scanned image-surface curvature located within the effective writing width satisfies the condition Fs/W<0.005.

In another preferred embodiment of the present invention, an optical scanning apparatus includes a light source for outputting light, a first lens system arranged to receive the light output from the light source and to transmit a light flux therefrom, an optical deflector arranged to receive the light flux from the first lens system and having a deflecting reflective plane to deflect the light flux from a surface therefrom and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist. The second lens system includes a scanning and image forming element including at least one surface including a plurality of portions each having a non-arc shape in a sub-scanning direction such that at least one lens surface is a sub non-circular arc surface and a shape in a sub-scanning cross section of the sub non-arc circular shape is a non-arc shape and the non-arc shape changes in accordance with a position of the sub-scanning cross section in the main scanning direction.

It should be noted that the preferred embodiments of the present invention are intended for use with apparatuses having a writing density of about 1200 dpi, 2400 dpi or greater than 2400 dpi. However, the preferred embodiments of the present invention may also be used with apparatuses having a writing density of about 300 dpi to 600 dpi.

The second lens system may preferably include either one lens element or two lens elements or more than two lens elements.

At least one surface of the lens element or lens elements of the second lens system is preferably non arc shape in a main scanning direction.

The light source in the apparatus of preferred embodiments of the present invention may be a single light beam source or a multiple beam source.

Other features, elements, advantages and improvements of the present invention will become evident in the following detailed description of preferred embodiments of the present invention with reference to the attached drawings.

BRIEF DESCRIPTION OF THE DRAWINGS

A more complete appreciation of the present invention and many of the attendants advantages thereof will be readily obtained as the same becomes better understood by reference to the following detailed description thereof when considered in conjunction with accompany drawings, wherein:

FIG. 6 is a diagram illustrating image-surface curvature and constant velocity characteristic of another preferred embodiment of the present invention;

FIGS. 8(a)–8(e) are diagrams illustrating wave aberrations at various image heights when an aperture for shaping beams has a substantially rectangular opening in the preferred embodiment of FIG. 6;

FIGS. 9(a)–9(e) are diagrams illustrating wave aberrations at various image heights when the aperture has substantially rectangular opening with rounded four corners in the preferred embodiment shown in FIG. 6;

DETAILED DESCRIPTION OF PREFERRED EMBODIMENTS

Figure 1:
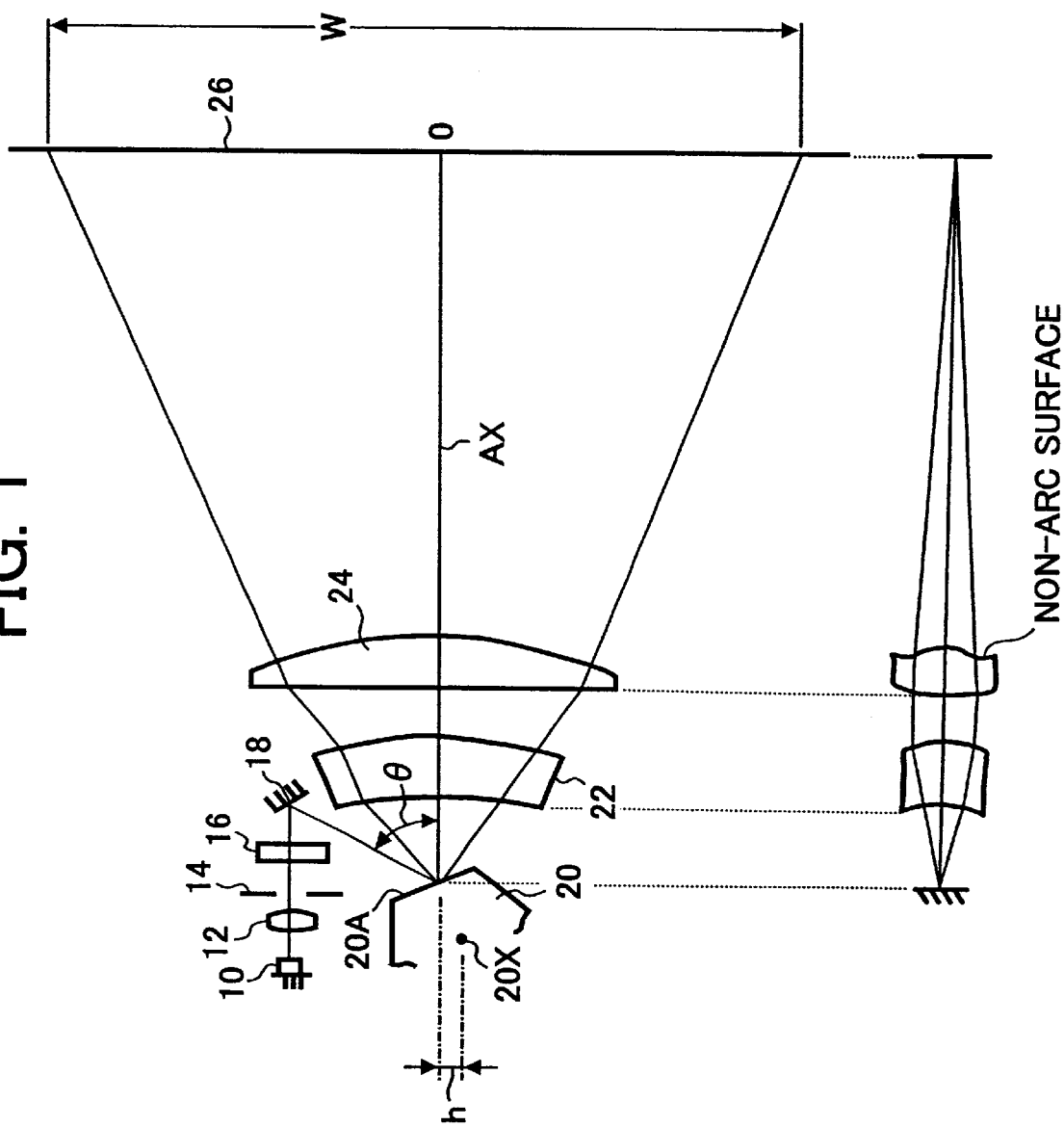
FIG. 1 is a schematic drawing illustrating a construction of an optical scanning image-forming apparatus according to a preferred embodiment of the present invention.

Referring now to the accompanying drawings, wherein like reference numerals designate identical or corresponding parts throughout the several views, preferred embodiments of the present invention are described.

A scanning image-forming optical system according to preferred embodiments of the present invention is a scanning image-forming optical system in which a deflected luminous flux deflected by a light deflecting device having a deflection reflective surface is converged as a beam spot on a scanned surface, and has characteristics as described below.

More specifically, the scanning image-forming optical system according to preferred embodiments of the present invention preferably includes one or more lenses, and at least one lens surface of the lenses is a sub non-circular arc surface.

According to at least one preferred embodiment of the present invention, the scanning image-forming optical system can be constituted of a single lens in the simplest form. The scanning image-forming system may also include two or more lenses, or may include a combination of one or more lenses and one or more elements of a reflective image-forming system, for example, such as a concave mirror or suitable elements.

The meaning of main scanning direction and sub-scanning direction in this specification refer to directions originally defined on the scanned surface, but in the present specification, directions corresponding to the main and sub-scanning directions along an optical path leading to the scanned surface from a light source are also referred to as the main and sub-scanning directions, respectively. Therefore, in a certain case, the main and sub-scanning directions are not necessarily parallel with the main and sub-scanning directions on the scanned surface.

The sub non-circular arc surface is defined as a shape in a sub-scanning cross section that is a non-circular arc shape, and the non-circular arc shape changes in accordance with a position of the sub-scanning cross section in the main scanning direction.

The sub-scanning cross-section indicates a virtual flat section which is substantially perpendicular to the main scanning direction in the vicinity of a lens surface. Moreover, in the vicinity of the lens surface, the virtual flat section coincident with a plane swept by a main beam of an ideal deflected luminous flux is referred to as the main scanning cross-section.

The shape of the sub non-circular arc surface in the scanning image-forming optical system is configured to correct the wave aberration in each scanned position on the scanned surface (converged position of the beam spot). Thereby, the optimum wave aberration can be set for each scanned position on the scanned surface.

The shape of the sub non-circular arc surface can be a non-circular shape even in the main scanning cross section. In this manner, in the entire pupil plane (luminous flux section on the sub non-circular arc surface of the deflected luminous flux incident upon an arbitrary position of the sub non-circular arc surface), the wave aberration is satisfactorily corrected. For the wave aberration correction in the scanning image-forming optical system according to preferred embodiments of the present invention, when a wavelength is $\lambda$, the wave aberration on a pupil in RMS (root mean square) is preferably about 0.1 $\lambda$ or less, more preferably about 0.07 λ (Marshal's diffraction limit) or less. More specifically, a wave aberration on a pupil in a root mean square is substantially equal to $$\sqrt{1/n \sum_{i=1}^{n} (x_i - x)^2},$$

wherein x is a height of wave aberration when an area of a beam spot with X and Z coordinates is divided into blocks i=1 through i=n and a used wavelength is λ. In each scanned position on the scanned surface, when the wave aberration is about 0.1 λ or less in RMS on the pupil, the satisfactory-shape, small-diameter beam spot is reliably and uniformly achieved.

There are many different ways to achieve this desired RMS relationship. For example, this RMS feature can be achieved by: (1) setting a non circular arc amount of a lens surface having a non arc shape to be different for all image heights so as to correct wave aberration for all image heights; (2) provide coupling lens which is constructed to correct wave aberration for image heights; (3) configure the first lens system to correct wave aberration for all image heights. Other suitable methods for achieving the desired RMS relationship for correcting wave aberration for all image heights may also be used.

For achieving a very small beam spot diameter, when the beam spot diameter of the beam spot on the scanned surface is defined with an intensity $1/e^2$ in a line spread function of light intensity distribution in the beam spot, an image-forming function of the scanning image-forming optical system can be set in such a manner that the spot diameter is about 50 μm or less in an effective writing range in both the main and sub-scanning directions.

For the line spread function, when a center coordinate of the beam spot formed on the scanned surface is used as a reference, and coordinates in the main and sub-scanning directions are Y, Z and the light intensity distribution of the beam spot is f (Y, Z), the line spread function LSZ in direction Z is defined with LSZ(Z)=∫f (Y, Z) dY (integration is performed on the entire width of the beam spot in direction Y), and the line spread function LSY in direction Y is defined with LSY(Y)=∫f (Y, Z) dZ (integration is performed on the entire width of the beam spot in direction Z).

These line spread functions LSZ(Z), LSY(Y) generally have substantial Gaussian distribution type shapes, and the beam spot diameters in the directions Y and Z are given at the widths in the directions Y, Z of an area in which these line spread functions LSZ(Z), LSY(Y) have maximum values of about $1/e^2$ or more. More specifically, the beam spot diameter in direction Y, Z defined in this manner is preferably about 50 μm or less in the effective writing range, irrespective of the image height of the beam spot. The beam spot diameter defined by the line spread functions as described above can easily be measured by scanning the beam spot via a slit at a uniform velocity, receiving light passed through the slit with an optical detector, and integrating a received light amount. An apparatus for performing such measurement is well known.

It is not easy to form the desired beam spot having a beam spot diameter of about 50 μm or less only with the geometric optical image-surface curvature correction, but according to preferred embodiments of the present invention, the desired beam spot having a beam diameter of about 50 μm or less is reliably achieved using one or more sub noncircular arc surfaces in the scanning image-forming optical system.

More specifically, there are many ways to correct field of curvature including: (1) provide non arc shape in the main scanning direction in each of four surfaces of two lens elements constituting the second lens system; (2) provide non arc shape in the main scanning direction in each of three surfaces of two lens elements constituting the second lens system; (3) correcting sub-scanning field of curvature by using a special toric surface for at least two lens surfaces in the second lens system; (4) increasing the number of lens elements. Other suitable methods for correcting field of curvature may also be used.

In the scanning image-forming optical system according to preferred embodiments of the present invention, a lateral magnification $\beta_0$ on an optical axis in the sub-scanning direction preferably satisfies a condition:

$$0.2 < |\beta_0| < 1.5. \quad (1)$$

When an upper limit 1.5 of the condition (1) is exceeded, the lateral magnification of the scanning image-forming optical system is increased. Therefore, when the beam spot diameter is to be reduced, an emission pupil diameter in the sub-scanning direction becomes excessively large and it becomes difficult to correct the wave aberration on the entire pupil. Furthermore, NA of a coupling lens for incorporating the luminous flux from the light source has to be enhanced. Moreover, environmental variations or image-surface position variations caused by a mounting error of the scanning image-forming optical system tend to increase, and it becomes difficult to reduce the beam spot diameter. When a lower limit 0.2 is exceeded, the magnification is excessively low, an aperture opening diameter is reduced, light transfer efficiency is lowered, and a high-speed writing becomes difficult.

In the scanning image-forming optical system according to the present invention, as regards the sub-scanning direction, the lateral magnification $\beta_0$ on the optical axis, and lateral magnification $\beta_h$ at an arbitrary image height h preferably satisfy the following condition:

$$0.93 < |\beta_h/\beta_0| < 1.07. \quad (2)$$

When the beam spot is converged, a beam waist diameter of luminous flux varies substantially in proportion to variations of the lateral magnification of the scanning image-forming optical system. Therefore, in order to obtain a beam spot having a uniform and stable beam spot diameter, it is important to make sure the lateral magnification is constant for each image height by making sure that the condition (2) is satisfied.

In the scanning image-forming optical system according to preferred embodiments of the present invention, a non-circular arc amount of the non-circular arc shape in the sub-scanning cross section of the sub non-circular arc surface can be changed asymmetrically relative to the main scanning direction, preferably for all image heights.

The non-circular arc amount is an amount of deviation from a circular arc (paraxial curvature radius).

When a rotating polygon mirror is used as the light deflecting device, its rotation center is deviated from the optical axis of the scanning image-forming optical system for installation. Therefore, in accordance with the deflection, a reflecting point in the deflection reflective surface changes, and a deflection starting point of the deflected luminous flux varies, so that an optical sag occurs. When the sag is present, a path through which the luminous flux passes differs on sides of plus and minus image heights of the optical axis of the scanning image-forming optical system. Thus, the generated wave aberration differs asymmetrically in accordance with the image height of the beam spot, but by arranging the non-circular arc amount of the sub non-circular arc surface of the scanning image-forming optical system so as to be asymmetric relative to the main scanning direction, the asymmetric wave aberration caused by the sag is corrected, and the optimum wave aberration is set for each image height.

In the scanning image-forming optical system according to preferred embodiments of the present invention, the paraxial curvature in the sub-scanning cross section changes asymmetrically relative to the main scanning direction, and at least one lens surface in which the change of the paraxial curvature has two or more extreme values can be provided.

The optical sag causes deterioration of the image-surface curvature especially of the sub-scanning direction (hereinafter referred to as sub-scanned image-surface curvature), but in the scanning image-forming optical system according to preferred embodiments of the present invention, by using at least one surface in which the paraxial curvature in the sub-scanning cross section changes in the main scanning direction, and the curvature change is asymmetric relative to the main scanning direction and has two or more extreme values, especially the lateral magnification of the sub-scanning direction can be kept substantially constant over the effective writing area to achieve a beam spot which is stable in beam spot diameter while the sub-scanned image-surface curvature is satisfactorily corrected.

Additionally, when the paraxial curvature in the sub-scanning cross section relative to a lens height h is represented by the function C(h) relative to the lens height h, the extreme value indicates a point at which its one-step differential is dC(h)/dh=0, and before and after which the sign of dC(h)/dh changes (maximum or minimum value is taken).

Generally, when the lateral magnification is to be kept constant, a high-order curved image-surface curvature is easily generated. Especially in the image-forming optical system with fewer number of lenses, a sagitall image-surface curvature is easily generated, which is represented by the expression "$aH^2+bH^4$", H being an image height, and a, b being coefficients.

As described above, when a plane is used, in which the change of the paraxial curvature radius in the sub-scanning cross section in the main scanning direction is provided with a plurality of extreme values, the high-order curved image-surface curvature is corrected by changing power on the lens surface in a high-order manner, so that the sub-scanned image-surface curvature can effectively be corrected.

In the scanning image-forming optical system according to preferred embodiments of the present invention, for at least one of the extreme values in the change of the paraxial curvature in the sub-scanning cross section, its position he of the main scanning direction and an effective lens height hmax from a lens optical axis on a plus or minus image-height side preferably satisfy a condition:

$$|(he)/(hmax)|>0.5. \quad (3)$$

An image height Hn of a maximum bulged position of the sagitall image-surface curvature represented by "$aH^2+bH^4$" is Hn=(1/√2) Hm=0.71 Hn, when Hm is an effective writing height ("Lens Design Technique (Optical Industry Technical Association)" authored by Fumio KONDO, pp.146–148).

In order to correct the bulge in the vicinity of about 0.71 times the effective writing height Hm, it is effective to provide the vicinity of the lens surface position corresponding to the relevant position with the extreme value of the curvature in the sub scanning cross section. Taking into consideration that the four-order or higher-order image-surface curvature is to be corrected, it is preferable that the aforementioned lie and hmax satisfy the condition (3). Additionally, hmax denotes an effective lens height on the plus image-height side when he>0, and an effective lens height on the minus image-height side when he<0.

Here, the plus image-height side means a side where the luminous flux from the light source is incident upon the deflection reflective surface.

In the scanning image-forming optical system according to preferred embodiments of the present invention, a lens surface where the paraxial curvature in the sub-scanning cross section changes asymmetrically relative to the main scanning direction and where the change of the paraxial curvature has two or more extreme values can be a sub non-circular arc surface. It should be noted that the lens surface may be a surface other than the sub non-circular arc surface.

In the scanning image-forming optical system according to preferred embodiments of the present invention, an effective writing width W, and a width Fs of the sub-scanned image-surface curvature in the effective writing width preferably satisfy the following condition:

$$Fs/W<0.005. \quad (4)$$

The condition (4) is preferably satisfied to obtain the stable small-diameter beam spot by preventing variation of the sub-scanned image-surface curvature.

In the above-mentioned scanning image-forming optical system according to preferred embodiments of the present invention, the shape of the sub non-circular arc surface in the main scanning cross section can be determined so as to correct a constant velocity characteristic of the beam spot. It should be noted that the shape of another surface in the main scanning cross section can be configured to achieve, the object described above.

The scanning image-forming optical system according to preferred embodiments of the present invention can be an anamorphic optical system having a function of placing the vicinity of the deflection reflective surface and the scanned surface position in a geometric optical conjugate relationship for the sub-scanning direction. In this manner, when the scanning image-forming optical system is anamorphic, the effect of surface tilt in the light deflecting device is corrected.

The scanning image-forming optical system of preferred embodiments of the present invention can also include one or more lenses as described above, and, therefore, can include two lenses.

When the scanning image-forming optical system is made of two lenses, the number of sub non-circular arc surfaces, the degree of freedom in arrangement, and further, the degree of freedom in the shape of other lens surfaces are greatly increased, so that desired optical characteristics are easily realized.

In the scanning image-forming optical system according to preferred embodiments of the present invention, if two lenses constitute the scanning image-forming lens, the sub non-circular arc surface may be used in a lens surface on the side of a scanned surface of a lens on the side of the scanned surface, or in a lens surface on the side of the light deflecting device of the lens on the side of the scanned surface.

The scanning image-forming optical system according to preferred embodiments of the present invention can have a function of converging a deflected luminous flux as a weak converged luminous flux in the main scanning direction onto the scanned surface, and a function of converging the deflected luminous flux as a parallel luminous flux in the main scanning direction onto the scanned surface.

An optical scanning device according to preferred embodiments of the present invention is an optical scanning device for deflecting a luminous flux from a light source by a light deflecting device having a deflection reflective surface, and converging the deflected luminous flux as a beam spot on the scanned surface by a scanning image-forming optical system to perform light scanning, characterized in that any one of the above-described scanning image-forming optical systems is used as the scanning image-forming optical system.

In the optical scanning device according to preferred embodiments of the present invention, the deflected luminous flux deflected by the light deflecting device is a weak converged luminous flux in the main scanning direction. Alternatively, the deflected luminous flux deflected by the light deflecting device is a parallel luminous flux in the main scanning direction.

As the light deflecting device, a rotating polygon mirror or a rotating two-surface mirror or a rotating single-surface mirror can preferably be used. The scanning image-forming optical system according to preferred embodiments of the present invention may include a system having no surface tilt correcting function. Therefore, in the optical scanning device according to preferred embodiments of the present invention, when the scanning image-forming optical system has no surface tilt correcting function, the rotating polygon mirror or the rotating two-surface mirror having excellent surface precision may be preferably used, or the rotating single-surface mirror having no surface tilt may be preferably used. In this case, the luminous flux from the light source (a semiconductor laser is generally used) is preferably taken via the coupling lens and caused to be incident upon the deflection reflective surface of the light deflecting device as the parallel luminous flux or a weakly convergent or divergent luminous flux. It should be noted that the coupled luminous flux is subjected to beam shaping by passing through an aperture opening.

In the optical scanning device according to preferred embodiments of the present invention, the scanning image-forming optical system may have a surface tilt correcting function, and the luminous flux from the light source may be formed into an image which is elongated in the main scanning direction in the vicinity of the deflection reflective surface of the light deflecting device. To achieve this desired result, the luminous flux from the light source is taken via the coupling lens, and the taken luminous flux (coupled luminous flux) may be formed into a linear image in the vicinity of the deflection reflective surface via a cylindrical lens or a concave mirror having a concave cylinder surface.

When the optical scanning device according to preferred embodiments of the present invention takes the luminous flux from the semiconductor laser as the light source via the coupling lens, shapes the luminous flux via the aperture, and forms the linear image which is elongated in the main scanning direction in the vicinity of the deflection reflective surface via the linear image forming optical system, the opening shape of the aperture for shaping the luminous flux can be configured to cut off four corner portions of the main or sub-scanning direction of the coupled luminous flux.

Now specific examples of preferred embodiments of the present invention are described herein below.

In FIG. 1, a light source 10 preferably includes a semiconductor laser for radiating a divergent luminous flux. The luminous flux radiated from the light source 10 is incorporated via a coupling lens 12 to form a weakly convergent luminous flux. The luminous flux is passed and shaped through an opening of an aperture 14, converged before entering a cylindrical lens 16 as a linear image forming optical system, and converged in a sub-scanning direction (direction that is perpendicular to the drawing) via the cylindrical lens 16. Additionally, an optical path is bent by a mirror 18, and the luminous flux is incident upon a deflection reflective surface 20A of a rotating polygon mirror 20 as light deflecting device. The luminous flux reflected by the deflection reflective surface 20A passes through lenses 22, 24 as the deflected luminous flux deflected at a constant velocity, accompanied by a constant velocity rotation of the rotating polygon mirror 20. The lenses 22, 24 constitute a scanning image-forming optical system to converge the deflected luminous flux as a beam spot on a scanned surface 26. The beam spot optically scans an effective writing width W of the scanned surface 26 at a constant velocity. The scanned surface 26 is substantially a photosensitive surface of a photoelectric photosensitive body.

In this example of preferred embodiments of the present invention, of the lenses 22, 24 constituting the scanning image-forming optical system, a sub non-circular arc surface is used in a lens surface of the lens 24 on the side of the scanned surface, to correct a wave aberration.

Figure 2:
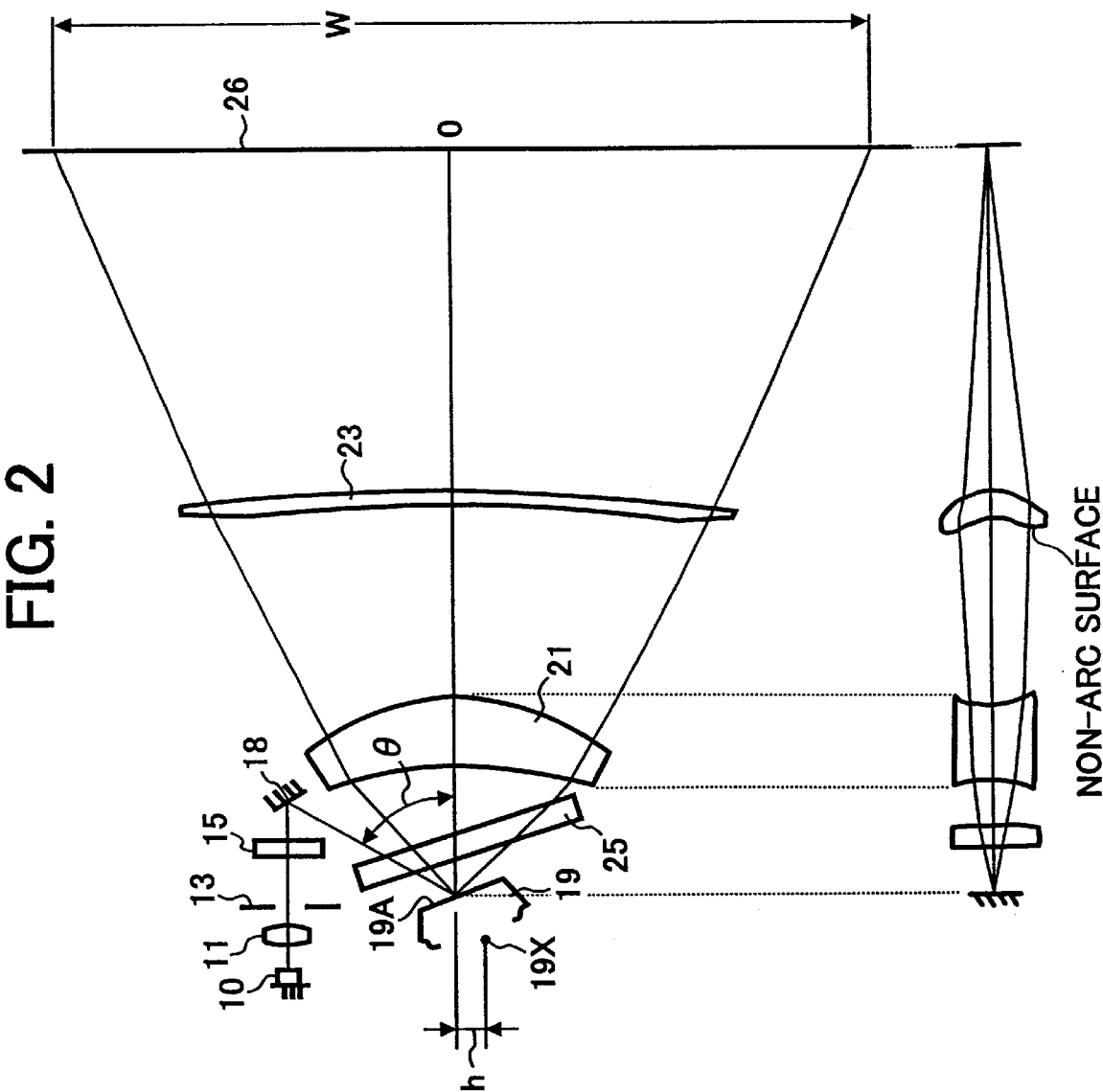
FIG. 2 is a schematic drawing illustrating a construction of another scanning image-forming apparatus according to another preferred embodiment of the present invention.

In FIG. 2 drawn in the same manner as FIG. 1, a divergent luminous flux radiated from the light source 10 preferably comprising a semiconductor laser is formed into a parallel luminous flux via a coupling lens 11. The luminous flux is passed and shaped through an opening of an aperture 13 before entering a cylindrical lens 15, and converged in the sub-scanning direction via the cylindrical lens 15. Additionally, an optical path is bent by the mirror 18, and the luminous flux is incident upon a deflection reflective surface 19A of a rotating polygon mirror 19. The luminous flux reflected by the deflection reflective surface 19A forms a deflected luminous flux deflected at a constant velocity in accordance with a constant velocity rotation of the rotating polygon mirror 19 to pass through lenses 21, 23 constituting a scanning image-forming optical system. The lenses 21, 23 converge the deflected luminous flux as a beam spot on the scanned surface 26, and the converged beam spot optically scans the scanned surface 26 at a constant velocity.

In this example of preferred embodiment, of the lenses 21, 23 constituting the scanning image-forming optical system, the sub non-circular arc surface is used in a lens surface of the lens 23 on the side of the rotating polygon mirror, to correct the wave aberration. Additionally, numeral 25 denotes soundproof glass provided at a window of a casing surrounding the rotating polygon mirror to muffle a rotating sound of the rotating polygon mirror 19.

More specifically, an optical scanning device according to preferred embodiments shown in FIG. 1 (FIG. 2) is preferably an optical scanning device which is arranged to deflect a luminous flux from the light source 10 via the light deflecting device 20 (19) having the deflection reflective surface 20A (19A), and to converge the deflected luminous flux as a beam spot on the scanned surface 26 via the scanning image-forming optical system 22, 24 (21, 23) to perform light scanning, in which the scanning image-forming optical system 22, 24 (21, 23) includes one or more lenses, at least one lens surface is a sub non-circular arc surface, and a shape of the lens surface is set to satisfactorily correct the wave aberration in each scanned position on the scanned surface 26.

Moreover, the optical scanning device shown in FIG. 1 (FIG. 2) is an optical scanning device for forming the luminous flux from the light source 10 into a linear image which is elongated in the main scanning direction, deflecting the luminous flux via the light deflecting device 20 (19) having the deflection reflective surface 20A (19A) in the vicinity of the linear image forming position, and converging the deflected luminous flux as the beam spot on the scanned surface 26 by the scanning image-forming optical system 22, 24 (21, 23) to perform light scanning (claim 20), in which the scanning image-forming optical system 22, 24 (21, 23) is an anamorphic optical system having a function of placing the vicinity of the deflection reflective surface 20A (19A) and the position of the scanned surface 26 in a geometric optical conjugate relationship relative to the sub-scanning direction, and includes two lenses.

Furthermore, in the preferred embodiment shown in FIG. 1, the deflected luminous flux deflected by the light deflecting device 20 is a weak converged luminous flux in the main scanning direction, the scanning image-forming optical system 22, 24 has a function of converging the deflected luminous flux as the weak converged luminous flux in the main scanning direction onto the scanned surface, and the lens surface on the side of the scanned surface of the lens 24 on the side of the scanned surface is a sub non-circular arc surface.

In the preferred embodiment shown in FIG. 2, the deflected luminous flux deflected by the light deflecting device 19 is a parallel luminous flux in the main scanning direction, the scanning image-forming optical system 21, 23 has a function of converging the deflected luminous flux as the parallel luminous flux in the main scanning direction onto the scanned surface, and a lens surface on the side of the light deflecting device of the lens 23 on the side of the scanned surface is a sub non-circular arc surface.

Three examples of preferred embodiments will now be described.

The shape of the lens surface is specified by following equations.

Coaxial Non-spherical Surface

Lens height: represented by a depth difference between an optical axis (H=0) and H.

More specifically, the coaxial non-spherical surface is represented in following equation (A) using a paraxial curvature radius R, cone constant K, and high-order coefficients $A_4$, $A_6$, ...

$$X=(H^2/R)/[1+\sqrt{1-(1+K)(H/R)^2}]+A_4 \cdot H^4+A_6 \cdot H^6+A_8 \cdot H^8+ \ldots \quad (A)$$

Non-Circular Arc Shape in Main scanning cross section

A depth X in an optical-axis direction is represented in the following polynomial equation (B) using a paraxial curvature radius Rm in the main scanning cross section, distance Y from the optical axis in the main scanning direction, cone constant Km, and high-order coefficients $A_1, A_2, A_3, A_4, A_5, A_6$ ...

$$X=(Y^2/Rm)/[1+\sqrt{1-(1+Km)(Y/Rm)^2}]+A_1 \cdot Y+A_2 \cdot Y^2+A_3 \cdot Y^3+A_4 \cdot Y^4+A_5 \cdot Y^5+A_6 \cdot Y^6+ \ldots \quad (B)$$

In the equation (B), when numeric values other than zero are substituted in odd-order $A_1, A_3, A_5$ ..., the shape becomes asymmetric in the main scanning direction.

Curvature in sub-scanning cross section

When the curvature changes within the sub-scanning cross section in the main scanning direction (coordinate with the optical axis position being an origin is represented by Y), the following equations (C) and (D) result. The equation (C) represents curvature Cs (Y), and (D) represents curvature radius Rs (Y). Additionally, Rs (0) represents a curvature radius on the optical axis in the sub-scanning cross section.

$$Cs(Y)=\{1/Rs(0)\}+B_1 \cdot Y+B_2 \cdot Y^2+B_3 \cdot Y^3+B_4 \cdot Y^4+B_5 \cdot Y^5+ \ldots \quad (C)$$

$$Rs(Y)=Rs(0)+B_1 \cdot Y+B_2 \cdot Y^2+B_3 \cdot Y^3+B_4 \cdot Y^4+B_5 \cdot Y^5+ \ldots \quad (D)$$

In the equations (C), (D), when numeric values other than zero are substituted in odd-order coefficients of Y, $B_1$, $B_3$, $B_5$, ..., the curvature (or the curvature radius) in the sub-scanning cross section becomes asymmetric in the main scanning direction.

Sub Non-Circular Arc Surface

The sub non-circular arc surface is represented in equation (E) using a position Y of sub-scanning cross section in the main scanning direction, and coordinate Z of the sub-scanning direction.

$$X=(Y^2/Rm)/[1+\sqrt{1-(1+Km)(Y/Rm)^2}]$$
$$+A_1 \cdot Y+A_2 \cdot Y^2+A_3 \cdot Y^3+A_4 \cdot Y^4+A_5 \cdot Y^5+ \ldots$$
$$+(Z^2 \cdot Cs)/[1+\sqrt{1-(1+Ks)(Z \cdot Cs)^2}]$$
$$+(F_0+F_1 \cdot Y+F_2 \cdot Y^2+F_3 \cdot Y^3+F_4 \cdot Y^4+ \ldots) \cdot Z$$
$$+(G_0+G_1 \cdot Y+G_2 \cdot Y^2+G_3 \cdot Y^3+G_4 \cdot Y^4+ \ldots) \cdot Z^2$$
$$+(H_0+H_1 \cdot Y+H_2 \cdot Y^2+H_3 \cdot Y^3+H_4 \cdot Y^4+ \ldots) \cdot Z^3$$
$$+(I_0+I_1 \cdot Y+I_2 \cdot Y^2+I_3 \cdot Y^3+I_4 \cdot Y^4+ \ldots) \cdot Z^4$$
$$+(J_0+J_1 \cdot Y+J_2 \cdot Y^2+J_3 \cdot Y^3+J_4 \cdot Y^4+ \ldots) \cdot Z^5$$
$$+(K_0+K_1 \cdot Y+K_2 \cdot Y^2+K_3 \cdot Y^3+K_4 \cdot Y^4+ \ldots) \cdot Z^6$$
$$+(L_0+L_1 \cdot Y+L_2 \cdot Y^2+L_3 \cdot Y^3+L_4 \cdot Y^4+ \ldots) \cdot Z^7$$
$$+(M_0+M_1 \cdot Y+M_2 \cdot Y^2+M_3 \cdot Y^3+M_4 \cdot Y^4+ \ldots) \cdot Z^8$$
$$+(N_0+N_1 \cdot Y+N_2 \cdot Y^2+N_3 \cdot Y^3+O_4 \cdot Y^4+ \ldots) \cdot Z^9$$
$$+(O_0+O_1 \cdot Y+O_2 \cdot Y^2+O_3 \cdot Y^3+O_4 \cdot Y^4+ \ldots) \cdot Z^{10}$$
$$+ \ldots \quad (E)$$

Here, Cs represents Cs(Y) defined in the equation (C). Moreover, Ks is defined by following equation (F).

$$Ks=Ks(0)+C_1 \cdot Y+C_2 \cdot Y^2+C_3 \cdot Y^3+C_4 \cdot Y^4+C_5 \cdot Y^5+ \ldots \quad (F)$$

When numeric values other than zero are substituted in odd square coefficients of Y, $B_1$, $B_3$, $B_5$ in equation (C) of Cs (Y), the change of the curvature radius in the sub-scanning cross section becomes asymmetric in the main scanning direction. In the same manner, when numeric values other than zero are substituted in $F_1$, $F_3$, $F_5$ ..., $G_1$, $G_3$, $G_5$ ... and the like, the non-circular arc amount in the sub-scanning cross section becomes asymmetric in the main scanning direction.

More specifically, as described above, the sub non-circular arc surface is a surface in which the shape in the sub-scanning cross section is a non-circular arc, and the non-circular arc shape in the sub-scanning cross section changes in accordance with the position of the sub-scanning cross section in the main scanning direction, but in the equation (E), first and second lines on the right side indicate the shape in the main scanning cross section with the function only of the coordinate Y of the main scanning direction. Moreover, for third and subsequent lines on the right side, when the coordinate Y of the sub-scanning cross section is determined, the coefficient of each-order term is univocally determined, and the non-circular arc shape in the sub-scanning cross section in the coordinate Y is determined.

Analytic representations of the coaxial non-spherical surface, non-circular arc shape in the main scanning cross section, curvature in the sub-scanning cross section, and sub non-circular arc surface are not limited to the above, various representations are possible, and the surface shape in the present invention is not limited to the representations defined by the above equations.

EXAMPLE 1

First, Example 1 is a specific example of the preferred embodiment shown in FIG. 1.

The luminous flux from the light source 10 or semiconductor laser is coupled by the coupling lens 12 to form a weakly convergent luminous flux. Assuming that the weakly convergent luminous flux fails to be subjected to refraction action of an optical element on the optical path, a natural light-converging position by the convergence of the luminous flux is referred to as natural light-converging point. In Example 1, the position of the natural light-converging point is in a position of about 700 mm toward the scanned surface from the deflection reflective surface, when the deflected luminous flux is transmitted toward the image height 0 of the beam spot on the scanned surface. Therefore, the deflected luminous flux is weakly convergent in the main scanning direction, and divergent in the sub-scanning direction. The scanning image-forming optical system 22, 24 is preferably an anamorphic optical system having a function of placing the vicinity of the deflection reflective surface 20A and the position of the scanned surface 26 in a geometric optical conjugate relationship relative to the sub-scanning direction, and also has a function of converging the deflected luminous flux as the converged luminous flux weak in the main scanning direction onto the scanned surface.

For the rotating polygon mirror 20 functioning as the light deflecting device, the number of deflection reflective surfaces is preferably six, an inscribed circle radius is about 18 mm, an incident angle shown in FIG. 1 is θ=60 degrees, and a distance between rotating axis 20X and scanning image-forming optical system optical axis AX is h=7.80 mm.

Additionally, here, to make supplementary comments on the optical axis AX shown in FIG. 1, in Example 1, the lens surfaces of two lenses 22, 24 constituting the scanning image-forming optical system are provided with tilt angles. The optical axis AX is considered to be a reference when the tilt angle is set to zero. When tilt is imparted to the reference, the actual surface direction of the lens 22, 24 is determined. The coaxial non-spherical surface, non-circular arc shape in the main scanning cross section, sub non-circular arc surface and the like have shapes specified where the tilt angle is set to zero.

A field angle of the scanning image-forming optical system is in the range of about −40.14 to about +40 degrees. Both surfaces of the lens 22 are coaxial non-spherical surfaces. The lens 24 has a sub non-circular arc surface on the side of the scanned surface, and a non-circular arc shape in the main scanning, cross section and a circular arc shape in the sub-scanning, cross section on the side of the rotating polygon mirror. Data on and after the deflection reflective surface (curvature radius is a paraxial curvature radius in the non-circular arc shape) are as follows:

| Surface No. | Rm | Rs(0) | x | α | n |
|---|---|---|---|---|---|
| Deflection reflective surface | 0 | ∞ | ∞ | 26.38 | | |
| Lens 22 | 1 | −100.91 | −100.91 | 18.00 | 0.10 | 1.52441 |
| | 2 | −76.40 | −76.40 | 13.06 | −0.17 | |
| Lens 24 | 3 | 4657.6 | 100.03 | 15.00 | −0.46 | 1.52441 |
| | 4 | −159.24 | −30.04 | −30.04 | −0.46 | |

Character "x" denotes a surface interval on the optical axis (when the tilt angle is zero), "α" denotes a tilt angle (in degrees, positive in a counterclockwise direction), and "n" denotes a refractive index of a lens material (for a desired wavelength of about 780 nm in all of the Examples 1 to 3)

Surface number 1, 2 represents the coaxial non-spherical surface, which is specified by applying each constant of the equation (A). For the surface number 3, the non-circular arc shape in the main scanning cross section is specified by giving each constant of the equation (B). Moreover, the shape in the sub-scanning cross section is a circular arc, but its curvature radius changes in the main scanning direction, and the shape is specified when each constant of the equation (C) or (D) is given. Moreover, since the surface number 4 denotes the sub non-circular arc surface, the shape in the main scanning cross section is determined by equation (B), the curvature change of the main scanning direction in the sub-scanning cross section is determined by equation (C), and the non-circular arc shape in the sub scanning cross section and its change of the main scanning direction are specified by equations (E) and (F).

Coefficients of main and sub-scanning directions of surfaces are shown in Table 1.

TABLE 1

(Example 1)

| Surface number | | Main scanning direction coefficient | | direction coefficient |
|---|---|---|---|---|
| 1 | K | −56.172 | — | |
| Equation (A) | $A_4$ | $-2.7017 \times 10^{-6}$ | — | |
| | $A_6$ | $4.4068 \times 10^{-5}$ | — | |
| | $A_8$ | $-4.7740 \times 10^{-12}$ | — | |
| | $A_{10}$ | $1.7929 \times 10^{-5}$ | — | |
| 2 | K | −10.639 | — | |
| Equation (A) | $A_4$ | $-1.6089 \times 10^{-7}$ | — | |
| | $A_6$ | $1.0329 \times 10^{-11}$ | — | |
| | $A_8$ | $-1.2355 \times 10^{-14}$ | — | |
| | $A_{10}$ | $5.7939 \times 10^{-17}$ | — | |
| 3 | K | −28683 | $B_1$ | 0 |
| Equation (B) | $A_1$ | 0 | $B_2$ | $1.1262 \times 10^{-2}$ |
| Equation (C) | $A_3$ | 0 | $B_3$ | 0 |
| | $A_4$ | $-5.7527 \times 10^{-8}$ | $B_4$ | $-3.1361 \times 10^{-6}$ |
| | $A_5$ | 0 | $B_5$ | 0 |
| | $A_6$ | $-3.0952 \times 10^{-12}$ | $B_6$ | $-3.0627 \times 10^{-10}$ |
| | $A_7$ | 0 | $B_7$ | 0 |
| | $A_8$ | $4.0588 \times 10^{-16}$ | $B_8$ | $1.6254 \times 10^{-10}$ |
| | $A_9$ | 0 | $B_9$ | 0 |
| | $A_{10}$ | $-3.80114 \times 10^{-19}$ | $B_{10}$ | $-2.2486 \times 10^{-16}$ |
| 4* | K | −0.9189 | $B_1$ | $-1.9122 \times 10^{-8}$ |
| Equation (B) | $A_1$ | | $B_2$ | $1.0415 \times 10^{-6}$ |
| Equation (C) | $A_3$ | | $B_3$ | $-8.8512 \times 10^{-9}$ |
| | $A_4$ | $-7.3824 \times 10^{-7}$ | $B_4$ | $5.3763 \times 10^{-11}$ |
| | $A_5$ | | $B_5$ | $7.2498 \times 10^{-12}$ |
| | $A_6$ | $1.6824 \times 10^{-10}$ | $B_6$ | $-1.1746 \times 10^{-13}$ |
| | $A_7$ | | $B_7$ | $-3.5899 \times 10^{-15}$ |

TABLE 1-continued (Example 1)

| Surface number | Main scanning direction coefficient | | direction coefficient | |
|---|---|---|---|---|
| | $A_8$ | $-3.5784 \times 10^{-14}$ | $B_8$ | $6.7888 \times 10^{-17}$ |
| | $A_9$ | | $B_9$ | $6.9604 \times 10^{-19}$ |
| | $A_{10}$ | $3.0590 \times 10^{-18}$ | $B_{10}$ | $-3.2046 \times 10^{-20}$ |

Coefficients of sub-scanning direction of surface No. 4 (sub non-circular arc surface of the lens 24 on the side of the scanned surface) are shown in Table 2.

TABLE 2

(Example 1)

| 4* | $C_0$ | 1.0407 | $K_0$ | $-9.4277 \times 10^{-7}$ |
|---|---|---|---|---|
| Equation (E) | $C_1$ | $2.1108 \times 10^{-3}$ | $K_1$ | $-3.9882 \times 10^{-9}$ |
| Equation (F) | $C_2$ | $-8.4082 \times 10^{-4}$ | $K_2$ | $8.4166 \times 10^{-10}$ |
| | $C_3$ | $-2.0507 \times 10^{-7}$ | $K_3$ | $4.1230 \times 10^{-13}$ |
| | $C_4$ | $5.8385 \times 10^{-5}$ | $K_4$ | $-5.8602 \times 10^{-14}$ |
| | $I_0$ | $-4.0142 \times 10^{-5}$ | $M_0$ | $2.1842 \times 10^{-6}$ |
| | $I_1$ | $-1.7132 \times 10^{-8}$ | $M_1$ | $5.9053 \times 10^{-9}$ |
| | $I_2$ | $3.5246 \times 10^{-9}$ | $M_2$ | $-1.0858 \times 10^{-9}$ |
| | $I_3$ | $-1.7825 \times 10^{-12}$ | $M_3$ | $-6.0908 \times 10^{-13}$ |
| | $I_4$ | $-2.4875 \times 10^{-13}$ | $M_4$ | $7.8246 \times 10^{-14}$ |

Figure 3:
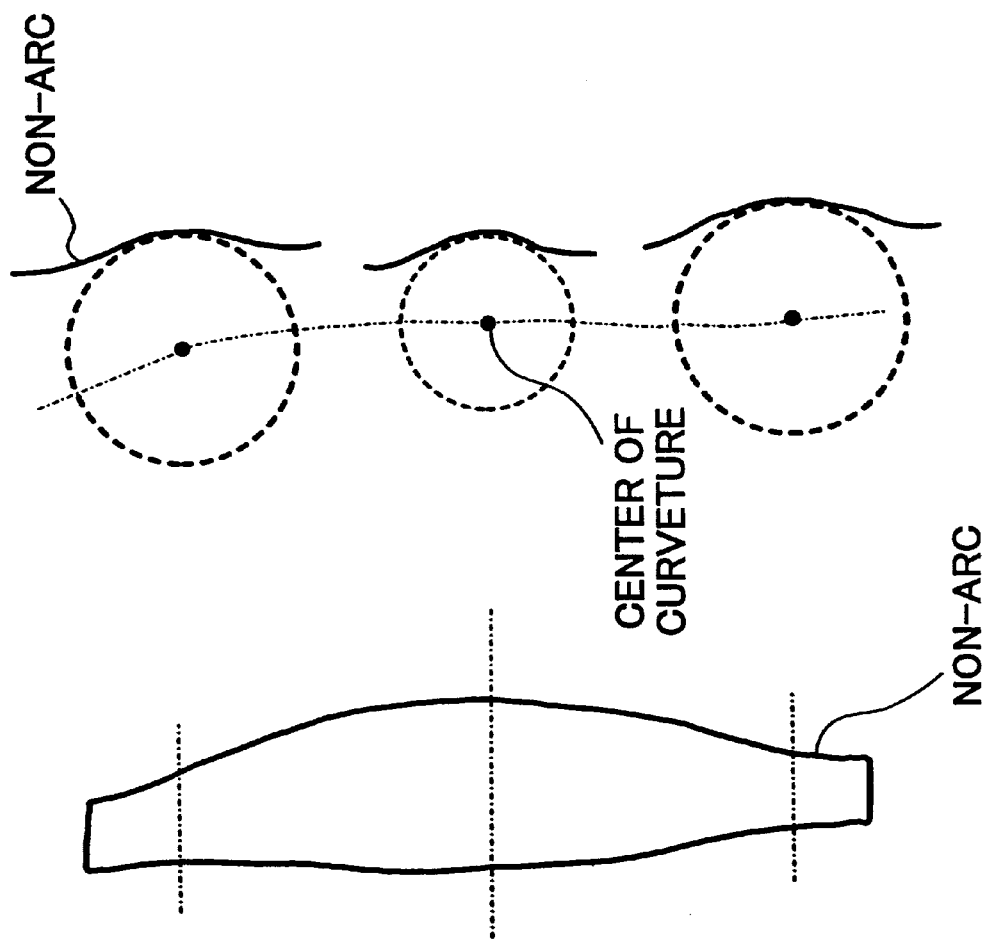
FIG. 3 is a diagram showing a non-arc shape in the main scanning direction used in at least one lens of the optical scanning image-forming apparatus according to preferred embodiments of the present invention.

FIG. 3 shows in more detail the specifics of the non-arc shape as described above.

Figure 4:
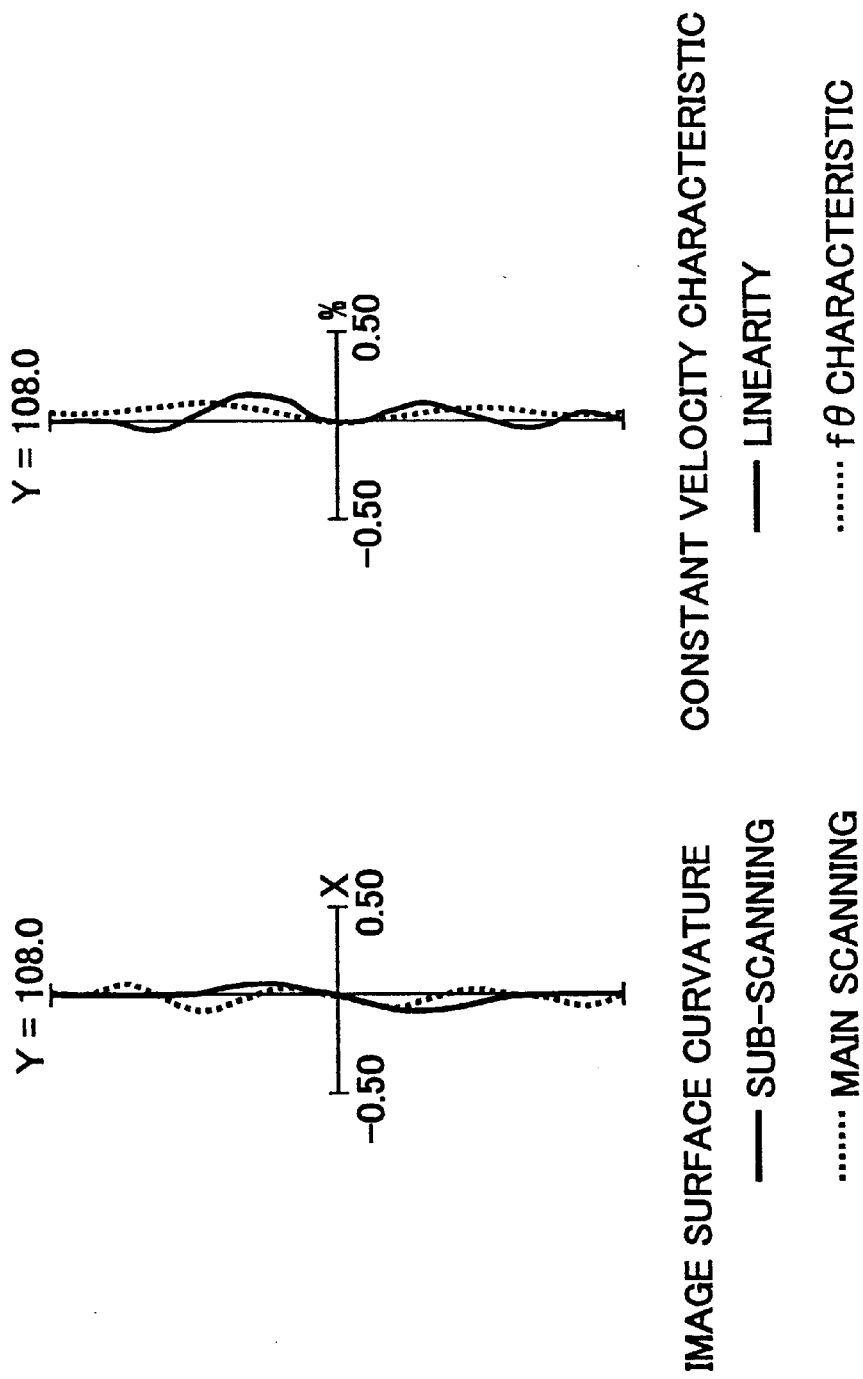
FIG. 4 is a diagrams illustrating image-surface curvature and a constant velocity characteristic of a preferred embodiment of the present invention.

FIG. 4 shows an image-surface curvature (in the left portion, a solid line shows the sub-scanning direction and a broken line shows the main scanning direction) and constant velocity characteristic (a solid line shows linearity and a broken line shows fθ characteristic) regarding the first preferred embodiment. The image-surface curvature and the constant velocity characteristic arc both corrected remarkably satisfactorily.

Figure 5A:
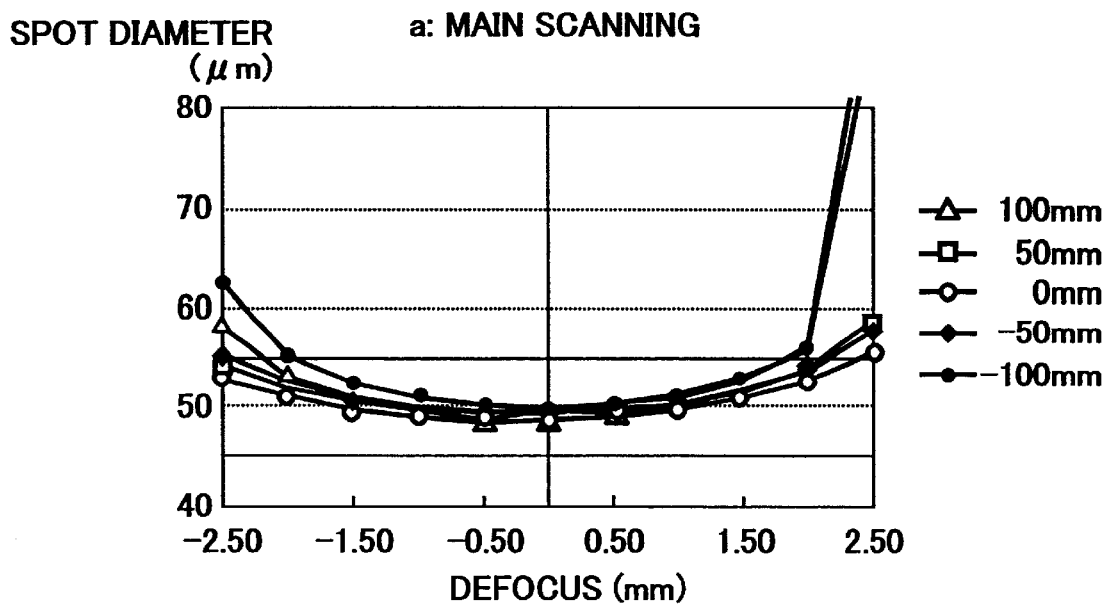
FIGS. 5(a) and 5(b) are diagrams illustrating depth curves of a beam spot diameter (variation the beam spot diameter relative to the defocusing of the beam spot) of a preferred embodiment of FIG. 4 in the main and sub-scanning directions, respectively.
Figure 5B:
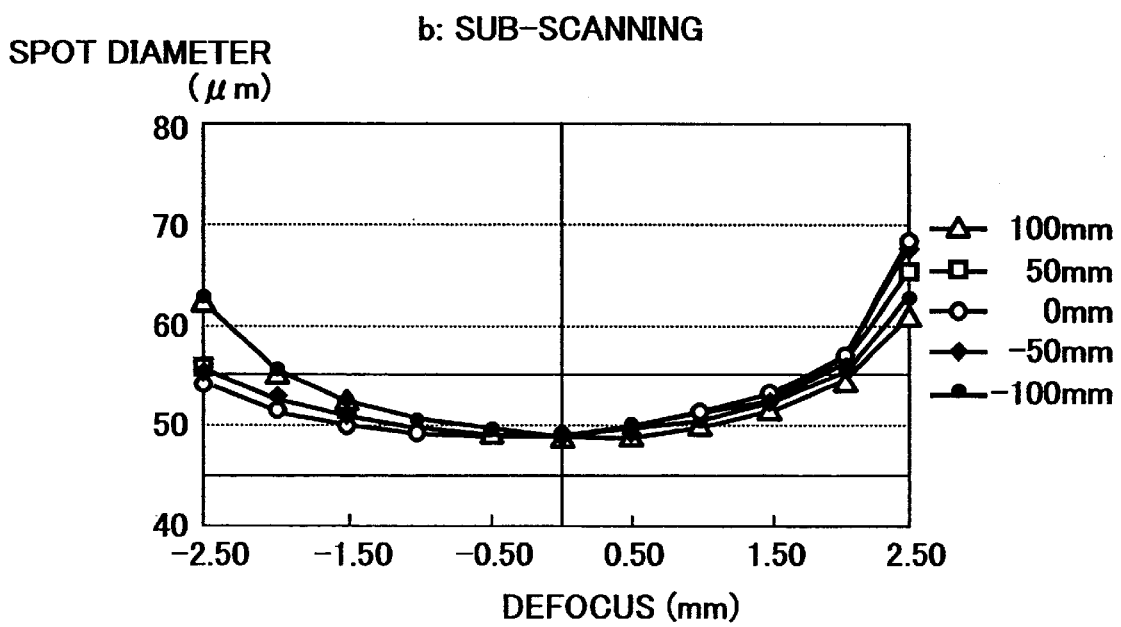

FIGS. 5(*a*) and 5(*b*) show a depth curve of a beam spot diameter (variation of beam spot diameter relative to the defocusing amount of the beam spot) in the image height of 0, ±50 mm, ±100 mm of the beam spot in the first preferred embodiment. While FIG. 5(*a*) relates to the main scanning direction, FIG. 5(*b*) relates to the sub-scanning direction. It is intended in the first preferred embodiment that the beam spot diameter defined with an intensity equal to about $1/e^2$ of line spread function is about 50 μm, and about 50 μm or less on the image surface. As shown in the drawing, the depth is satisfactory in either the main or sub-scanning direction, and an allowable degree for position precision of the scanned surface is high.

EXAMPLE 2

Next, Example 2 is a specific example of the preferred embodiment shown in FIG. 2.

The luminous flux from the light source 10 or semiconductor laser is coupled by the coupling lens 11 to form the parallel luminous flux. Therefore, the position of the natural light-converging point is at a position of ∞ toward the scanned surface from the deflection reflective surface. Accordingly, the deflected luminous flux is a parallel luminous flux in the main scanning direction, and divergent in the sub-scanning direction. The scanning image-forming optical system 21, 23 is an anamorphic optical system having a function of placing the vicinity of the deflection reflective surface 19A and the position of the scanned surface 26 in a geometric optical conjugate relationship relative to the sub-scanning direction, and also has a function of converging the parallel luminous flux in the main scanning direction onto the scanned surface. The rotating polygon mirror 19 as the light deflecting device preferably has 5 deflection reflective surfaces and an inscribed circle radius of about 13 mm, and an incident angle shown in FIG. 1 is θ=60 degrees, and a distance between a rotating axis 19X and a scanning image-forming optical system optical axis AX is preferably about h=7.53 mm.

In Example 2, of two lenses 21, 23 constituting the scanning image-forming optical system, the lens surface of the lens 23 on the side of the rotating polygon mirror is provided with a shift amount (parallel movement in the main scanning direction and positive upward). The optical axis AX is considered to be a reference when the shift amount is set to zero. When the shift amount is provided to the reference, the actual position of the lens surface is determined. In this case, the coaxial non-spherical surface, non-circular arc shape in the main scanning cross section, sub non-circular arc surface and the like have the shapes specified and have a shift amount set to zero.

The field angle of the scanning image-forming optical system is in the range of about −39.97 to about +39.97 degrees. Both surfaces of the lens 21 are coaxial non-spherical surfaces. The lens 23 has a sub non-circular arc surface on the side of the rotating single-surface mirror, and circular arc shapes (curvature radius in the sub-scanning cross section changes in the main scanning direction) in both the main and sub-scanning cross sections on the side of the scanned surface. The data on and after the deflection reflective surface (curvature radius is a paraxial curvature radius in the non-circular arc shape) are as follows:

| Surface No. | Rm | Rs(0) | x | y | α | n |
|---|---|---|---|---|---|---|
| Deflection reflective surface 0 | ∞ | ∞ | 25.44 | | | |
| Soundproof glass | | | | | | |
| 1 | ∞ | ∞ | 2.01 | | 8 | 1.51433 |
| 2 | ∞ | ∞ | 25.42 | | 8 | |
| Lens 21 | | | | | | |
| 3 | −312.60 | −312.60 | 31.40 | | | 1.52716 |
| 4 | −82.95 | −82.95 | 78.00 | | | |
| Lens 23 | | | | | | |
| 5 | −500.0 | −42.67 | 3.50 | | −0.41 | 1.52716 |
| 6 | −1000.0 | −23.32 | 141.50 | | | |

Character "x" denotes a surface interval on the optical axis (when the shift is zero), "y" denotes the shift amount, and "α" denotes the tilt angle of the soundproof glass (in degrees).

Since both of the surface numbers 3, 4 are preferably coaxial non-spherical surfaces, they are specified when given the constants of the equation (A). For the surface number 6, the curvature radius of the circular arc shape in the sub-scanning cross section changes in the main scanning direction, and the surface is specified when given the constants of the equation (C) or (D). Moreover, since the surface number 5 denotes the sub non-circular arc surface, the shape in the main scanning cross section is determined by equation (B), the curvature change of the main scanning direction in the sub-scanning cross section is determined with by (C), and the non-circular arc shape in the sub-scanning cross section and its change of the main scanning direction arc specified by equations (E) and (F).

Coefficients of main and sub-scanning directions of surfaces are shown in Table 3.

TABLE 3

(Example 2)

| Surface number | | Main scanning direction coefficient | | direction coefficient |
|---|---|---|---|---|
| 3 | K | 2.6671 | — | |
| Equation (A) | $A_4$ | $1.7857 \times 10^{-7}$ | — | |
| | $A_6$ | $-1.0807 \times 10^{-12}$ | — | |
| | $A_8$ | $-3.1812 \times 10^{-14}$ | — | |
| | $A_{10}$ | $3.7403 \times 10^{-18}$ | — | |
| 4 | K | | | 0.0193 |
| Equation (A) | $A_4$ | $2.5031 \times 10^{-7}$ | — | |
| | $A_6$ | $9.6058 \times 10^{-12}$ | — | |
| | $A_8$ | $4.5447 \times 10^{-15}$ | — | |
| | $A_{10}$ | $-3.0343 \times 10^{-18}$ | — | |
| 5* | K | $-71.7319$ | $B_1$ | 0 |
| Equation (B) | $A_1$ | 0 | $B_2$ | $-4.72602 Z 10^{-7}$ |
| Equation (C) | $A_3$ | 0 | $B_3$ | $-8.38263 Z 10^{-10}$ |
| | $A_4$ | $4.3256 \times 10^{-8}$ | $B_4$ | $9.04894 Z 10^{-11}$ |
| | $A_5$ | 0 | $B_5$ | $4.37405 Z 10^{-13}$ |
| | $A_6$ | $-5.9729 \times 10^{-13}$ | $B_6$ | $-6.01229 Z 10^{-15}$ |
| | $A_7$ | 0 | $B_7$ | $-6.46929 Z 10^{-17}$ |
| | $A_8$ | $-1.2819 \times 10^{-16}$ | $B_8$ | $2.55750 Z 10^{-20}$ |
| | $A_9$ | 0 | $B_9$ | $3.04068 Z 10^{-21}$ |
| | $A_{10}$ | $5.7297 \times 10^{-21}$ | $B_{10}$ | $2.36799 Z 10^{-23}$ |
| 6 | K | 0 | $B_1$ | 0 |
| Equation (B) | $A_1$ | 0 | $B_2$ | $-1.5557 \times 10^{-4}$ |
| Equation (C) | $A_3$ | 0 | $B_3$ | 0 |
| | $A_4$ | 0 | $B_4$ | $-7.64287 \times 10^{-10}$ |
| | $A_5$ | 0 | $B_5$ | 0 |
| | $A_6$ | 0 | $B_6$ | $1.29011 \times 10^{-12}$ |
| | $A_7$ | 0 | $B_7$ | 0 |
| | $A_8$ | 0 | $B_8$ | $-8.88372 \times 10^{-17}$ |
| | $A_9$ | 0 | $B_9$ | 0 |
| | $A_{10}$ | 0 | $B_{10}$ | $-6.79872 \times 10^{-21}$ |

Coefficients of sub-scanning direction of surface No. 5 (sub non-circular are surface of lens 23 on the side of the rotating polygon mirror) are shown in Table 4.

TABLE 4

(Example 2)

| 5* | | | | |
|---|---|---|---|---|
| | $C_0$ | 2.5821 | $K_0$ | $-3.77145 \times 10^{-7}$ |
| Equation (E) | $C_1$ | $-2.99305 \times 10^{-4}$ | $K_1$ | $4.72035 \times 10^{-12}$ |
| Equation (F) | $C_2$ | $-6.20612 \times 10^{-5}$ | $K_2$ | $2.65693 \times 10^{-11}$ |
| | $C_3$ | 0 | $K_3$ | $-1.69246 \times 10^{-15}$ |
| | $C_4$ | 0 | $K_4$ | $-1.20928 \times 10^{-15}$ |
| | $I_0$ | $-3.02237 \times 10^{-5}$ | $M_0$ | $-1.71892 \times 10^{-9}$ |
| | $I_1$ | $-2.75077 \times 10^{-10}$ | $M_1$ | $-8.23793 \times 10^{-13}$ |
| | $I_2$ | $6.59149 \times 10^{-11}$ | $M_2$ | $-5.52334 \times 10^{-15}$ |
| | $I_3$ | $2.06446 \times 10^{-14}$ | $M_3$ | $1.23174 \times 10^{-16}$ |
| | $I_4$ | $7.98792 \times 10^{-18}$ | $M_4$ | $2.17562 \times 10^{-17}$ |

FIG. 6 shows an image-surface curvature and constant velocity characteristic regarding Example 2 in the same manner as FIG. 3. The image-surface curvature and the constant velocity characteristic are both corrected remarkably satisfactorily.

Figure 7A:
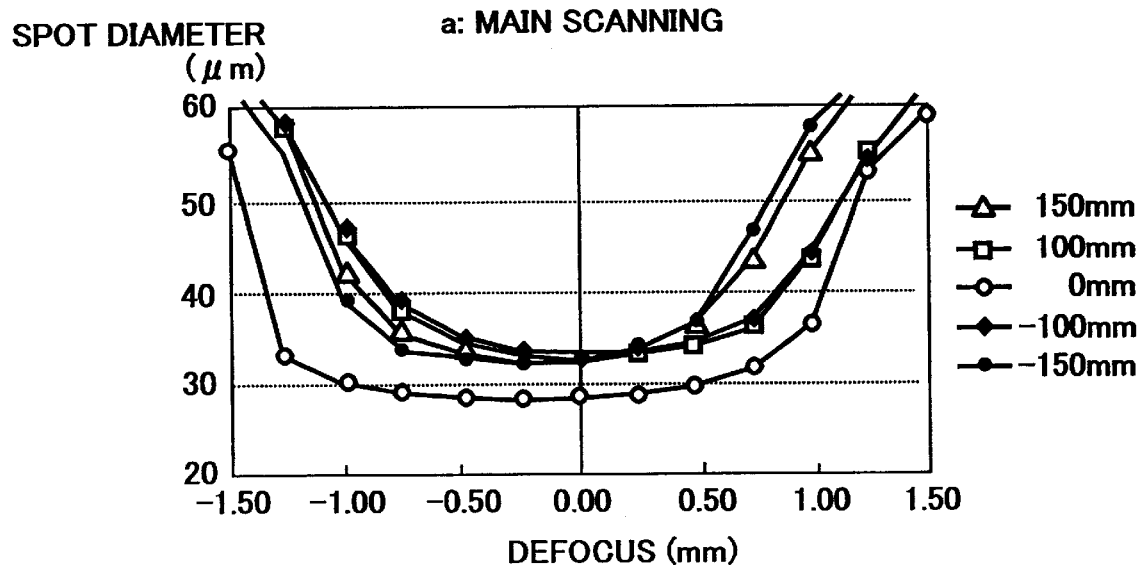
FIGS. 7(a) and 7(b) diagrams illustrating depth curves of a beam spot diameter (variation of beam spot diameter relative to the defocusing of the beam spot) of another preferred embodiment of FIG. 6 in the main and sub-scanning directions, respectively.
Figure 7B:
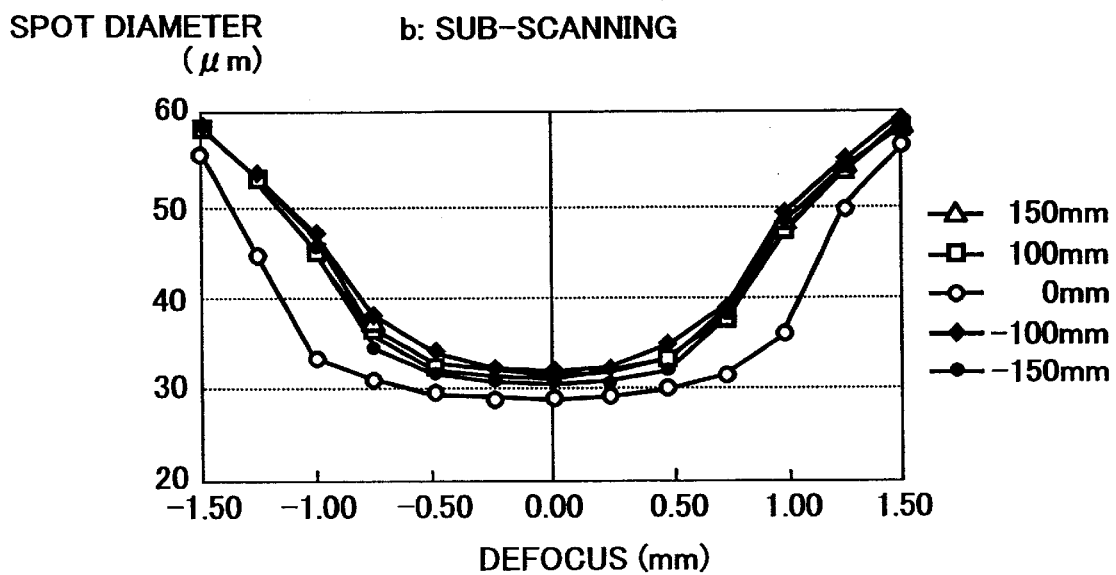

FIGS. 7(*a*) and 7(*b*) show a depth curve of a beam spot diameter at an image height of 0, ±100 mm, ±150 mm of the beam spot in Example 2. While FIG. 7(*a*) relates to the main scanning direction, FIG. 7(*b*) relates to the sub-scanning direction. The beam spot diameter intended in the embodiment 2 is about 30 μm with the beam spot diameter having an intensity of about $1/e^2$ of line spread function. As shown in the drawing, the depth is satisfactory in either main or sub-scanning direction, and an allowable degree for position precision of the scanned surface is high.

FIGS. 8(*a*)–8(*e*) show wave aberrations in Example 2. While FIG. 8(*a*) shows a wave aberration in the image height of ±150 mm, FIG. 8(*b*) shows a wave aberration in the image height of ±100 mm, FIG. 8(*c*) denotes an image height of 0 mm, and FIGS. 8(*d*) and 8(*e*) show wave aberrations in the image heights of −100 mm, −150 mm, respectively. Additionally, in this case, the aperture 13 for shaping beams which has a substantially rectangular opening is used.

As seen from FIGS. 8(*a*)–8(*e*), in Example 2, the wave aberration is substantially completely corrected at the image height 0 of the beam spot, but slightly insufficiently corrected for four corners with the image height of +150 mm. The deterioration of the wave aberration of four corners on a pupil as shown in FIG. 8(*a*) influences the shape/spot diameter of the beam spot. In Example 2, as described above, a substantially rectangular shape (substantially rectangular shape having long sides in the main scanning direction, and short sides in the sub-scanning direction) is used as the opening shape of the aperture 13 for shaping beams is used. To remove the influence of the deterioration of the wave aberration on four corners on the pupil onto the beam spot as shown in FIG. 8(*a*), an opening shape of the aperture 13 preferably is substantially rectangular or elliptical and includes cut off four-corner portions of the main/subs-canning direction of the coupled luminous flux so as to define a substantially rectangular or elliptical shape including four rounded four corners.

In Example 2, when the substantially rectangular or elliptical shape with four rounded corners is used as the opening shape of the aperture 13, wave aberrations on the pupil in the beam spot image heights of 0, ±100 mm, ±150 mm are shown. Specifically, FIG. 9(*a*) shows a wave aberration at the image height of 150 mm, FIG. 9(*b*) shows a wave aberration at the image height of 100 mm, FIG. 9(*c*) shows a wave aberration at the image height of 0, FIG. 9(*d*) shows a wave aberration at the image height of −100 mm, and FIG. 9(*e*) shows a wave aberration in the image height of ±150 mm.

Figure 12A:
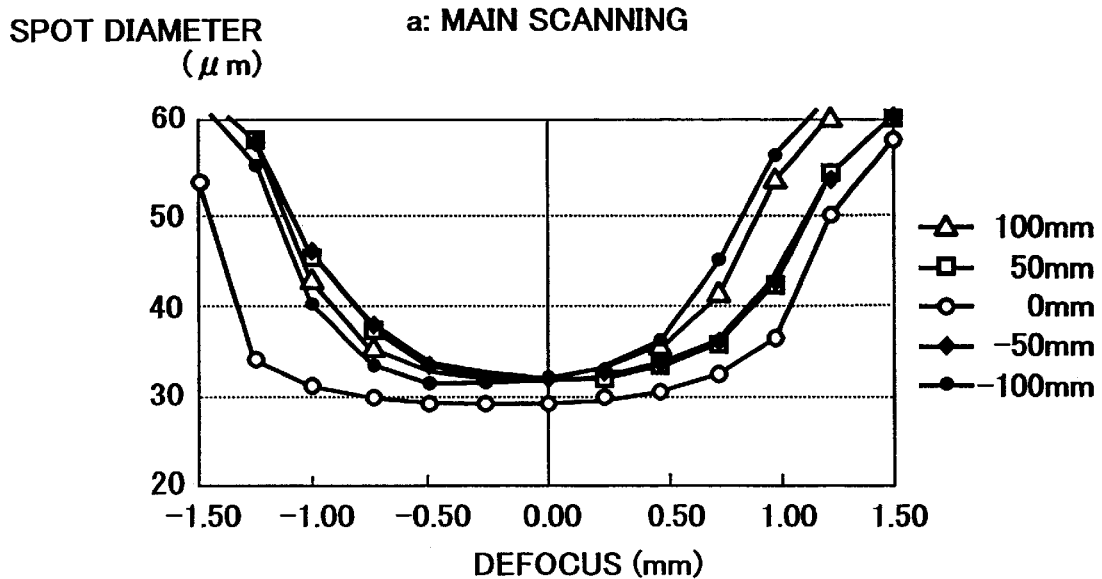
FIGS. 12(a) and 12(b) diagrams illustrating depth curves of a beam spot diameter (variation of beam spot diameter relative to the defocusing of the beam spot) of the preferred embodiment of FIG. 6 in the main and sub-scanning directions, respectively, when the aperture has a substantially rectangular opening with rounded four corners.
Figure 12B:
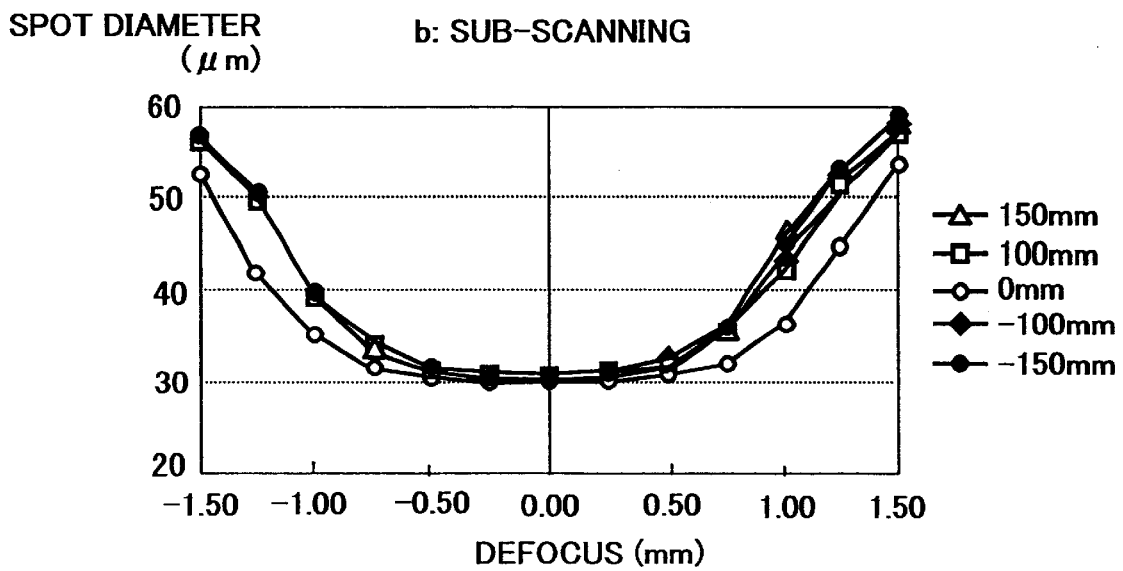

As compared with the wave aberrations shown in FIGS 8(*a*)–8(*e*), RMS wave aberrations are remarkably improved on the pupil surface. In this case, FIGS. 12(*a*) and 12(*b*) show beam spot diameter depth curves at the beam spot image heights of 0, ±100 mm, ±150 mm. While FIG. 12(*a*) relates to the main scanning direction, FIG. 12(*b*) relates to the sub-scanning direction. As compared with the case of FIGS. 6(*a*) and 6(*b*) (the aperture having a substantially rectangular opening is used), especially the depth allowance of the sub-scanning direction can be enlarged.

Figure 10:
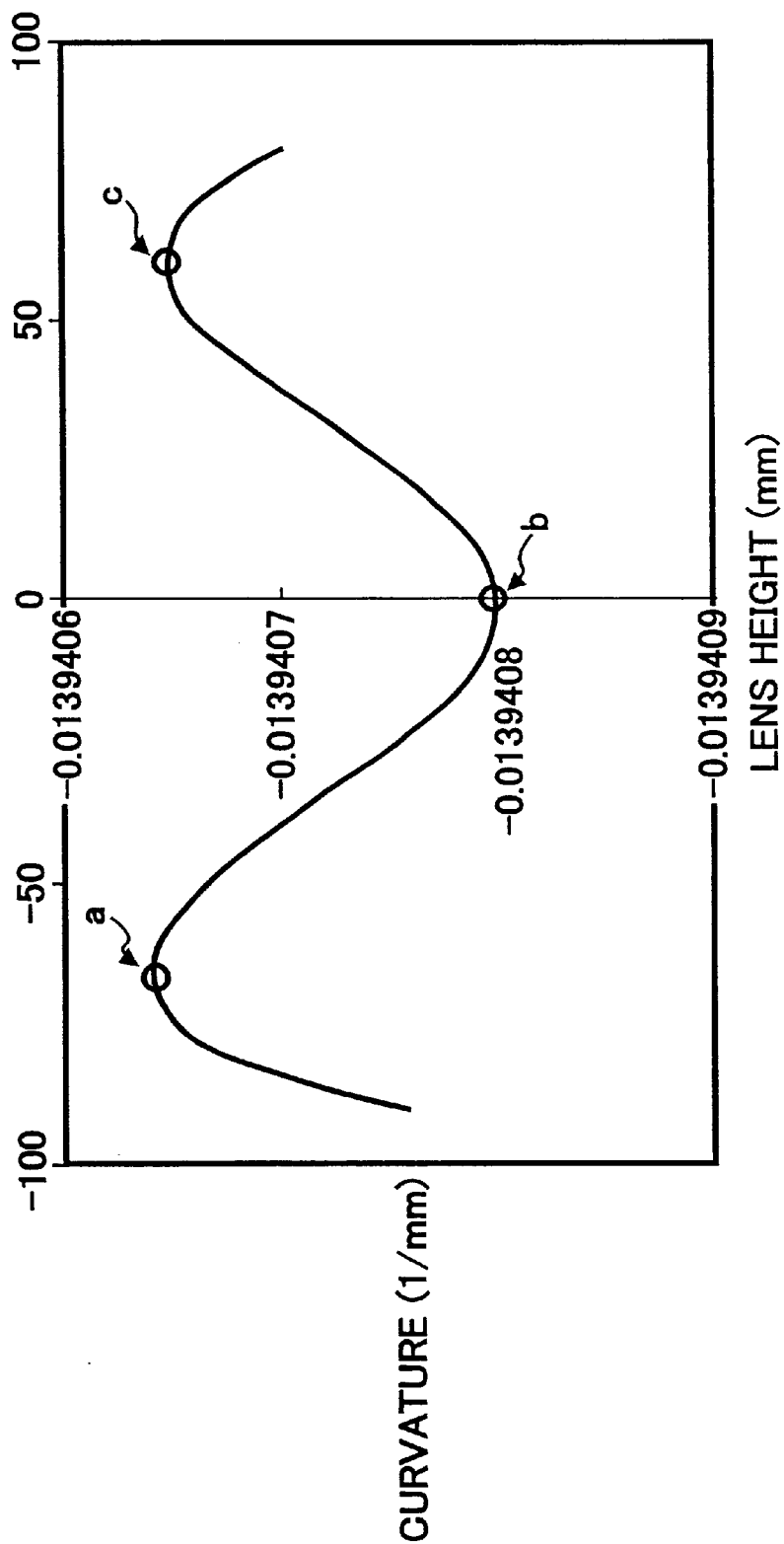
FIG. 10 is a diagram illustrating changes of the paraxial curvature in the sub-scanning cross-section of the sub non-circular arc shape in the main scanning direction in the preferred embodiment of FIG. 6.

FIG. 10 shows changes of the paraxial curvature of the sub-scanning cross section of the sub non-circular arc surface (the surface on the side of rotating polygon mirror of the lens on the side of the scanned surface with the surface number 5) in the main scanning direction in Example 2. As shown in FIG. 10, the paraxial curvature in the sub-scanning cross section changes in the main scanning direction, and the curvature change is asymmetric in the main scanning direction and has two or more extreme values.

EXAMPLE 3

Example 3 is also a specific example of the preferred embodiment shown in FIG. 2.

The luminous flux from the light source 10 or semiconductor laser is coupled by the coupling lens 11 to form the parallel luminous flux. Therefore, the deflected luminous flux is a parallel luminous flux in the main scanning direction, and divergent in the sub-scanning direction. The scanning image-forming optical system 21, 23 is an anamorphic optical system having a function of placing the vicinity of the deflection reflective surface 19A and the position of the scanned surface 26 in a geometric optical conjugate relationship relative to the sub-scanning direction, and also has a function of converging the deflected luminous flux as the parallel luminous flux in the main scanning direction onto the scanned surface 26.

The rotating polygon mirror 19 functioning as the light deflecting device preferably has five deflection reflective surfaces and an inscribed circle radius of about 13 mm, and the incident angle shown in FIG. 1 is θ=60 degrees, and the distance between the rotating axis and the scanning image-forming optical system optical axis AX is about h=5.22 mm.

In Example 3, two lenses 21, 23 constituting the scanning image-forming optical system are provided with no tilt angle/shift amount.

The field angle of the scanning image-forming optical system is in the range of about −42 to about +42 degrees. The lens 21 has a coaxial non-spherical surface on the side of the rotating polygon mirror, and a non-circular arc shape in the main scanning cross section and a circular arc shape in the sub-scanning cross section on the side of the scanned surface, while the curvature radius changes in the main scanning direction. The lens 23 has a sub non-circular arc surface on the side of the rotating polygon mirror, and a toroidal surface on the side of the scanned surface. The data on and after the deflection reflective surface (curvature radius is a paraxial curvature radius in the non-circular arc shape) are as follows:

| Surface No. | Rm | Rs(0) | x | y | α | n |
|---|---|---|---|---|---|---|
| Deflection reflective surface 0 | ∞ | ∞ | 25.44 | 1.588 | | |
| Soundproof glass | | | | | | |
| 1 | ∞ | ∞ | 2.01 | | 8 | 1.51433 |
| 2 | ∞ | ∞ | 25.42 | | 8 | |
| Lens 21 | | | | | | |
| 3 | −312.60 | −312.60 | 31.40 | | | 1.52716 |
| 4 | −82.95 | 104.02 | 78.00 | | | |
| Lens 23 | | | | | | |
| 5 | −500.0 | −63.50 | 3.50 | | | 1.52716 |
| 6 | −1000.0 | −23.38 | 143.38 | | | |

Shift "y" means that the optical system on and after the deflection reflective surface entirely shifts only by 1.588, and "α" denotes the tilt angle (in degrees) of the soundproof glass.

The surface number 3 is a coaxial non-spherical surface specified when given the constants of the equation (A). For the surface number 4, the non-circular arc shape in the main scanning cross section is specified by equation (B), and the change of the main scanning direction in the curvature radius in the sub-scanning cross section is specified by equation (C). Since the surface number 5 denotes the sub non-circular arc surface, the shape in the main scanning cross section is determined by equation (B), the curvature change of the main scanning direction in the sub-scanning cross section is determined by equation (C), and the non-circular arc shape in the sub-scanning cross section and its change of the main scanning direction are specified by equations (E) and (F).

Coefficients of main and sub-scanning directions of surfaces are shown in Table 5.

TABLE 5

(Example 3)

| Surface number | | Main scanning direction coefficient | | direction coefficient |
|---|---|---|---|---|
| 3 | K | 2.6671 | — | |
| Equation (A) | $A_4$ | $1.7857 \times 10^{-7}$ | — | |
| | $A_6$ | $-1.0807 \times 10^{-12}$ | — | |
| | $A_8$ | $-3.1812 \times 10^{-14}$ | — | |
| | $A_{10}$ | $3.7403 \times 10^{-18}$ | — | |
| 4 | K | 0.0193 | $B_2$ | $-2.1855 \times 10^{-7}$ |
| Equation (B) | $A_4$ | $2.5031 \times 10^{-7}$ | $B_4$ | $-6.8348 \times 10^{-10}$ |
| Equation (C) | $A_6$ | $9.6058 \times 10^{-2}$ | $B_6$ | $1.9548 \times 10^{-13}$ |
| | $A_8$ | $4.5447 \times 10^{-15}$ | $B_8$ | $8.6565 \times 10^{-13}$ |
| | $A_{10}$ | $-3.0343 \times 10^{-18}$ | $B_{10}$ | $-1.3677 \times 10^{-20}$ |
| | | | $B_{12}$ | $-3.2528 \times 10^{-24}$ |
| | | | $B_{14}$ | $4.7205 \times 10^{-28}$ |
| | | | $B_{16}$ | $3.9957 \times 10^{-31}$ |
| | | | $B_{18}$ | $-5.8552 \times 10^{-35}$ |
| 5* | K | −71.7319 | $B_1$ | −9.5132-07 |
| Equation (B) | $A_1$ | 0 | $B_2$ | −1.0179-06 |
| Equation (C) | $A_3$ | 0 | $B_3$ | 2.9721-10 |
| | $A_1$ | $4.3256 \times 10^{-8}$ | $B_4$ | 7.5379-11 |
| | $A_5$ | 0 | $B_5$ | −2.9473-14 |
| | $A_6$ | $-5.9729 \times 10^{-13}$ | $B_6$ | 12 5.4844-16 |
| | $A_7$ | 0 | $B_7$ | 4.1734-19 |
| | $A_8$ | $-1.2819 \times 10^{-16}$ | $B_8$ | −1.9406-19 |
| | $A_9$ | 0 | $B_9$ | 1.0447-22 |
| | $A_{10}$ | $5.7297 \times 10^{-21}$ | $B_{10}$ | −1.2851-23 |
| | | | $B_{11}$ | 2.1339-27 |
| | | | $B_{12}$ | 5.0995-29 |
| | | | $B_{13}$ | −4.6561-31 |
| | | | $B_{14}$ | 7.5063-32 |
| | | | $B_{15}$ | −4.4273-35 |
| | | | $B_{16}$ | 5.8948-36 |
| | | | $B_{17}$ | 2.6911-39 |
| | | | $B_{18}$ | −3.4755-40 |

Coefficients of sub-scanning direction of surface No. 5 (sub non-circular arc surface of lens 23 on the side of the rotating polygon mirror) are shown in Tables 6 and 7.

TABLE 6

(Example 3)

| 5* | $C_0$ | −0.10052+02 | $K_0$ | −0.54249−05 |
|---|---|---|---|---|
| Equation (E) | $C_1$ | 0.10456−01 | $K_1$ | 0.27589−08 |
| Equation (F) | $C_2$ | 0.16043−01 | $K_2$ | 0.40441−08 |
| | $C_3$ | −0.38810−04 | $K_3$ | −0.10214−10 |
| | $C_4$ | −0.10795−04 | $K_4$ | −0.30236−11 |
| | $C_5$ | 0.24649−07 | $K_5$ | 0.74022−14 |
| | $C_6$ | 0.34813−08 | $K_6$ | 0.10175−14 |
| | $C_7$ | −0.79177−11 | $K_7$ | −0.22278−17 |
| | $C_8$ | −0.62576−12 | $K_8$ | −0.18297−18 |
| | $C_9$ | 0.14305−14 | $K_9$ | 0.35070−21 |
| | $C_{10}$ | 0.68155−16 | $K_{10}$ | 0.19279−22 |
| | $C_{11}$ | −0.15016−18 | $K_{11}$ | −0.31042−25 |
| | $C_{12}$ | −0.46481−20 | $K_{12}$ | −0.12245−26 |
| | $C_{13}$ | 0.90675−23 | $K_{13}$ | 0.15609−29 |
| | $C_{14}$ | 0.19560−24 | $K_{14}$ | 0.45816−31 |
| | $C_{15}$ | −0.29175−27 | $K_{15}$ | −0.41677−34 |
| | $C_{16}$ | −0.46741−29 | $K_{16}$ | −0.91912−36 |
| | $C_{17}$ | 0.38721−32 | $K_{17}$ | 0.45899−39 |
| | $C_{18}$ | 0.48737−34 | $K_{18}$ | 0.74711−41 |
| | $I_0$ | 0.50108−05 | $M_0$ | 0.60483−06 |
| | $I_1$ | −0.71522−08 | $M_1$ | −0.60493−10 |
| | $I_2$ | −0.94329−08 | $M_2$ | −0.38193−09 |
| | $I_3$ | 0.29968−10 | $M_3$ | 0.44521−12 |
| | $I_4$ | 0.87187−11 | $M_4$ | 0.25695−12 |
| | $I_5$ | −0.28570−13 | $M_5$ | −0.20044−15 |
| | $I_6$ | −0.35454−14 | $M_6$ | −0.75042−16 |
| | $I_7$ | 0.10163−16 | $M_7$ | −0.24566−20 |
| | $I_8$ | 0.78408−18 | $M_8$ | 0.10314−19 |
| | $I_9$ | −0.18615−20 | $M_9$ | 0.12901−22 |
| | $I_{10}$ | −0.10350−21 | $M_{10}$ | −0.59018−24 |

TABLE 6-continued (Example 3)

| | | | | |
|---|---|---|---|---|
| | $I_{11}$ | 0.19267-24 | $M_{11}$ | -0.25130-26 |
| | $I_{12}$ | 0.84093-26 | $M_{12}$ | -0.88063-29 |
| | $I_{13}$ | -0.11391-28 | $M_{13}$ | 0.20958-30 |
| | $I_{14}$ | -0.41267-30 | $M_{14}$ | 0.29035-32 |
| | $I_{15}$ | 0.35905-33 | $M_{15}$ | -0.82447-35 |
| | $I_{16}$ | 0.11223-34 | $M_{16}$ | -0.13775-36 |
| | $I_{17}$ | -0.46817-38 | $M_{17}$ | 0.12546-39 |
| | $I_{18}$ | -0.12986-39 | $M_{18}$ | 0.21833-41 |

TABLE 7

(Example 3)

| | | | | |
|---|---|---|---|---|
| 5* | $O_0$ | -0.22979-07 | $O_{10}$ | -0.59495-25 |
| Equation (E) | $O_1$ | -0.46238-11 | $O_{11}$ | 0.15648-27 |
| Equation (F) | $O_2$ | 0.11760-10 | $O_{12}$ | 0.82774-29 |
| | $O_3$ | -0.41106-14 | $O_{13}$ | -0.11727-31 |
| | $O_4$ | -0.62792-14 | $O_{14}$ | -0.56109-33 |
| | $O_5$ | -0.14430-17 | $O_{15}$ | 0.43914-36 |
| | $O_6$ | 0.10515-17 | $O_{16}$ | 0.19030-37 |
| | $O_7$ | 0.32077-20 | $O_{17}$ | -0.65284-41 |
| | $O_8$ | 0.11144-21 | $O_{18}$ | -0.25859-42 |
| | $O_9$ | -0.10653-23 | | |

Figure 11:
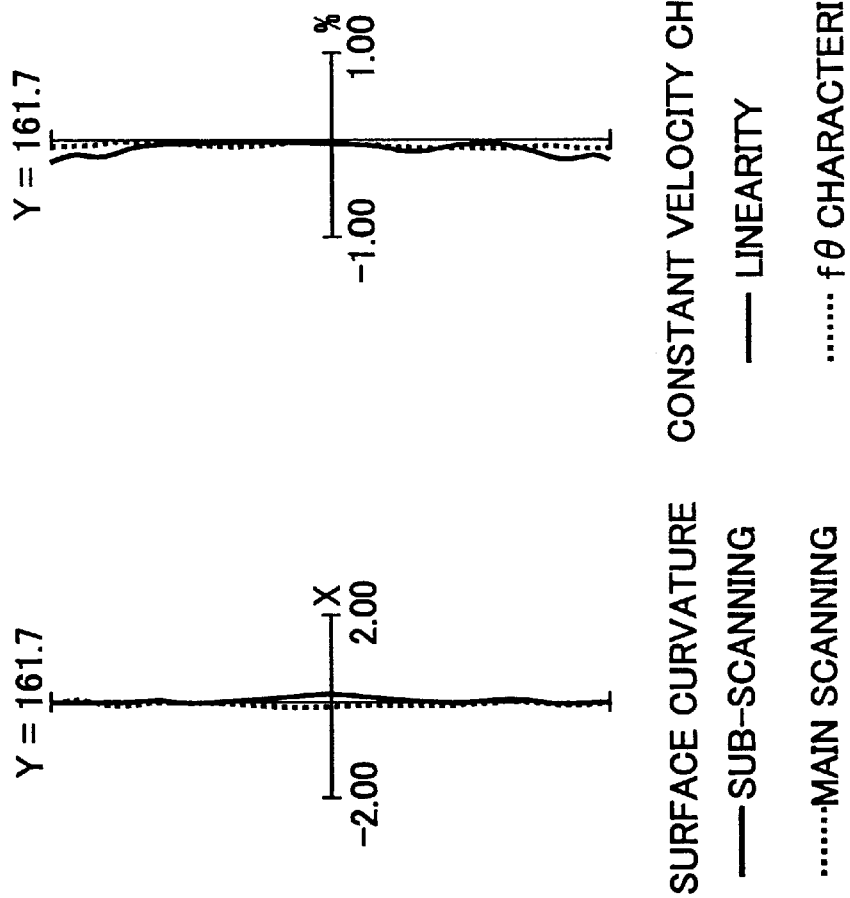
FIG. 11 is a diagram illustrating image-surface curvature and constant velocity characteristic of a Gird preferred embodiment.

FIG. 11 shows an image-surface curvature and constant velocity characteristic regarding the Example 3 in the same manner as FIG. 4. The image-surface curvature and the constant velocity characteristic are both corrected remarkably satisfactorily.

Non-circular arc amounts of the non-circular arc shape in the sub-scanning cross section of the surface 5 as the sub non-circular arc surface in Example 3 (lens surface on the side of a light deflector of the lens on the side of the scanned surface), i.e., deviation amounts from a circular arc (in the unit of mm) are shown in Table 8.

The non-circular arc amount changes asymmetrically to the lens optical axis in accordance with the position in the main scanning direction of the sub-scanning cross section. By setting the non-circular arc amount in this manner, the wave aberrations on the pupil are corrected for all image heights, and the influence of optical sag is eliminated, so that a satisfactory small-diameter beam spot can be formed.

Regarding the above-mentioned Examples 1 to 3, parameter values of condition (1), and condition (4) will be described below.

Condition (1)

Example 1: $|\beta_0|$=2.51

Example 2: $|\beta_0|$=0.78

Example 3: $|\beta_0|$=0.73

Since the condition (1) is satisfied in Examples 2, 3, but not satisfied in Example (1), Example 1 has a larger limitation to the reduction of the beam spot diameter as compared with examples 2, 3.

condition (4)

Example 1: Fs/W=0.131/216=0.0006

Example 2: Fs/W=0.131/300=0.0001

Example 3: Fs/W=0.137/320=0.0004

Examples 1 to 3 preferably all satisfy condition (4), so that a very stable small-diameter beam spot is obtained by suppressing the variation of the sub-scanned image-surface curvature. Additionally, Examples 1 to 3 all preferably satisfy condition (2). More specifically, in each example of preferred embodiments, by using two or more surfaces in which the paraxial curvature in the sub-scanning cross section changes in accordance with the main scanning direction, the front/rear main point position is set in a desired position, the magnification of each image height is kept constant, and a stable beam spot is obtained. In Examples 1, 2, the main point position is arbitrarily set by bending incident and emission side surfaces of the lens on the side of the scanned surface, to achieve a constant lateral magnifi-

TABLE 8

(Example 3)

| Y coordinate mm/ Z coordinate mm | 0.0 | 0.5 | 1.0 | 1.5 | 2.0 | 2.5 | 3.0 | 3.5 | 4.0 |
|---|---|---|---|---|---|---|---|---|---|
| 120 | 0.000 | 0.000 | -0.001 | -0.004 | 0.011 | 0.106 | 0.400 | 0.945 | 1.190 |
| 110 | 0.000 | 0.000 | -0.001 | 0.000 | 0.027 | 0.140 | 0.429 | 0.924 | 1.311 |
| 100 | 0.000 | 0.000 | 0.000 | 0.010 | 0.061 | 0.211 | 0.521 | 1.039 | 1.895 |
| 90 | 0.000 | 0.000 | 0.001 | 0.015 | 0.081 | 0.259 | 0.589 | 1.091 | 2.019 |
| 80 | 0.000 | 0.000 | 0.000 | 0.015 | 0.087 | 0.277 | 0.619 | 1.153 | 2.359 |
| 70 | 0.000 | 0.000 | -0.001 | 0.012 | 0.084 | 0.274 | 0.614 | 1.209 | 2.984 |
| 60 | 0.000 | 0.000 | -0.001 | 0.011 | 0.081 | 0.269 | 0.600 | 1.225 | 3.395 |
| 50 | 0.000 | 0.000 | -0.001 | 0.013 | 0.086 | 0.277 | 0.608 | 1.250 | 3.550 |
| 40 | 0.000 | 0.000 | 0.000 | 0.016 | 0.094 | 0.289 | 0.628 | 1.306 | 3.735 |
| 30 | 0.000 | 0.000 | 0.000 | 0.017 | 0.095 | 0.288 | 0.626 | 1.339 | 4.000 |
| 20 | 0.000 | 0.000 | -0.001 | 0.011 | 0.083 | 0.268 | 0.594 | 1.304 | 4.170 |
| 10 | 0.000 | 0.000 | -0.004 | 0.002 | 0.066 | 0.244 | 0.556 | 1.238 | 4.182 |
| 0 | 0.000 | -0.001 | -0.005 | -0.003 | 0.057 | 0.234 | 0.543 | 1.212 | 4.158 |
| -10 | 0.000 | 0.000 | -0.004 | 0.002 | 0.066 | 0.246 | 0.563 | 1.247 | 4.165 |
| -20 | 0.000 | 0.000 | -0.001 | 0.011 | 0.084 | 0.272 | 0.600 | 1.304 | 4.105 |
| -30 | 0.000 | 0.000 | 0.001 | 0.018 | 0.098 | 0.293 | 0.631 | 1.330 | 3.908 |
| -40 | 0.000 | 0.000 | 0.001 | 0.018 | 0.098 | 0.294 | 0.638 | 1.316 | 3.692 |
| -50 | 0.000 | 0.000 | -0.001 | 0.013 | 0.087 | 0.280 | 0.620 | 1.280 | 3.594 |
| -60 | 0.000 | 0.000 | -0.002 | 0.009 | 0.080 | 0.268 | 0.600 | 1.235 | 3.477 |
| -70 | 0.000 | 0.000 | -0.001 | 0.011 | 0.082 | 0.271 | 0.600 | 1.186 | 3.101 |
| -80 | 0.000 | 0.000 | 0.000 | 0.014 | 0.086 | 0.275 | 0.613 | 1.166 | 2.639 |
| -90 | 0.000 | 0.000 | 0.000 | 0.012 | 0.077 | 0.258 | 0.595 | 1.141 | 2.389 |
| -100 | 0.000 | 0.000 | -0.002 | 0.005 | 0.058 | 0.208 | 0.470 | 0.808 | 1.459 |
| -110 | 0.000 | 0.000 | -0.003 | -0.002 | 0.032 | 0.126 | 0.192 | -0.125 | -1.464 |
| -120 | 0.000 | 0.000 | -0.004 | -0.007 | 0.014 | 0.057 | -0.071 | -1.047 | -4.370 | cation. Moreover, in Example 3, the main point position is arbitrarily set by bending the emission-side surface of the lens on the side of the rotating polygon mirror, and the incident-side surface on the side of the scanned surface, to achieve a constant lateral magnification.

In Example 2, as shown in FIG. 9, the paraxial curvature in the sub-scanning cross section of the lens surface on the side of the rotating polygon mirror (incident side) of the lens on the side of the scanned surface of the scanning image-forming optical system changes asymmetrically in the main scanning direction, and three extreme value positions a, b, c are provided. For these a, b, c positions, calculation of parameters of condition (3) provide following:

point a: $|(he)/(hmax)|=|(-65)/(-90)|=0.72$
point b: $|(he)/(hmax)|=|(0)/(44.8)|=0$
point c: $|(he)/(hmax)|=|(+62)/(+90)|=0.69$ Of the three extreme values, the extreme values by which the image-surface curvature is effectively corrected are points a and c which satisfy the condition (3).

Since the scanning image-forming optical system of preferred embodiments of the present invention includes special surface shapes as described above, manufacturing using plastic as a material for the lenses of the scanning image-forming optical system is suitable.

As described above, according to the scanning image-forming optical system of preferred embodiments of the present invention, because the wave aberration is effectively corrected using the sub non-circular arc surface, a small-diameter beam spot of about 50 µm or less can be reliably achieved. Moreover, in the optical scanning device of preferred embodiments of the present invention, the scanning image-forming optical system can be used to realize a greatly increased writing density and a very small-diameter beam spot having a uniform diameter.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An optical scanning apparatus comprising:
   a light source for outputting light;
   a first lens system arranged to receive the light output from the light source and to transmit a light flux therefrom;
   an optical deflector arranged to receive the light flux from the first lens system and having a deflecting reflective plane to deflect the light flux from a surface therefrom; and
   a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface including a plurality of portions each having a non-arc shape in a sub-scanning direction such that at least two of the non-arc shapes are different from each other and such that an effective writing width W and a width Fs of the sub-scanned image-surface curvature located within the effective writing width satisfies the condition Fs/W<0.005.

2. An optical scanning apparatus according to claim 1, wherein the second lens system includes at least two lens elements providing four lens surfaces, each of the four lens surfaces having the non arc shape in the main scanning direction.

3. An optical scanning apparatus according to claim 1, wherein the second lens system includes at least two lens elements providing four lens surfaces, at least three of the four lens surfaces having the non arc shape in the main scanning direction.

4. An optical scanning apparatus according to claim 1, wherein the second lens system includes at least two lens elements providing four lens surfaces, at least two of the four lens surfaces having the non arc shape in the sub-scanning direction and each of the non arc shapes of the at least two surfaces is shaped such that a radius of curvature in a sub-scanning cross-section changes in a direction corresponding to the main scanning direction such that a curvature center line plotting a curvature center in the sub-scanning cross-section of the at least one surface in the direction corresponding to the main scanning direction is a curve which is different from the non arc shape in the deflecting reflective plane.

5. An optical scanning apparatus according to claim 1, wherein the second lens system includes at least three lens elements.

6. An optical scanning apparatus according to claim 1, wherein the second lens system includes only one lens element.

7. An optical scanning apparatus according to claim 1, wherein the second lens system includes at least two lens elements.

8. An optical scanning apparatus according to claim 1, wherein the images formed on the surface to be scanned have a writing density of about 600 dots per inch to about 1200 dots per inch.

9. An optical scanning apparatus according to claim 1, wherein the images formed on the surface to be scanned have a writing density of about 1200 dots per inch to about 2400 dots per inch.

10. An optical scanning apparatus according to claim 1, wherein the images formed on the surface to be scanned have a writing density of greater than about 2400 dots per inch.

11. An optical scanning apparatus according to claim 1, wherein the light source is constructed to emit multiple light beams.

12. An optical scanning apparatus according to claim 1, wherein the second lens system includes at least one lens having a sub noncircular arc surface having a shape that is configured to align the beam waist position with a geometric optic image forming position.

13. An optical scanning apparatus according to claim 1, wherein the scanning and image forming element comprises an anamorphic optical system which is arranged such that the deflecting reflective surface and the scanned surface position have a geometric optical conjugate relationship for the sub-scanning direction.

14. An optical scanning apparatus according to claim 1, wherein a lateral magnification $\beta_0$ on the optical axis and a lateral magnification $\beta_h$ at an arbitrary image height h, both in the sub-scanning direction, satisfies a condition $0.93 < |\beta_h/\beta_0| < 1.07$.

15. An optical scanning apparatus according to claim 1, wherein the non-arc shape of the plurality of portions of the at least one surface are arranged such that the beam waist of the entire light flux is located at the surface to be scanned for all image heights.

16. An image forming apparatus comprising:

a light source for outputting light;

a first lens system arranged to receive the light output from the light source and to transmit a light flux therefrom;

an optical deflector arranged to receive the light flux from the first lens system and having a deflecting reflective plane to deflect the light flux from a surface therefrom; and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface including a plurality of portions each having a non-arc shape in a sub-scanning direction such that at least two of the non-arc shapes are different from each other and such that an effective writing width W and a width Fs of the sub-scanned image-surface curvature located within the effective writing width satisfies the condition $Fs/W<0.005$.

17. A method of forming a lens system for an optical scanning apparatus for optically scanning a surface to be scanned by deflecting a luminous flux emitted from a light source at equiangular velocity via an optical deflector so as to transmit the deflected luminous flux through the lens system and to condense the deflected luminous flux into an optical beam spot on the surface to be scanned so as to form images having image heights, the luminous flux condensed by the lens system into the optical beam spot including an optical beam waist, the method comprising:

forming a scanning and image forming element to have at least one surface having a plurality of portions each of which contains a non-arc shape in a sub-scanning direction such that all beam spot diameters are within a range for all image heights and such that an effective writing width W and a width Fs of the sub-scanned image-surface curvature located within the effective writing width satisfies the condition $Fs/W<0.005$.

* * * * *